United States Patent
Tian

(10) Patent No.: US 9,776,640 B1
(45) Date of Patent: Oct. 3, 2017

(54) AUTOMATIC DETERMINATION OF MAXIMUM ACCELERATION FOR MOTION PROFILES

(71) Applicant: LINESTREAM TECHNOLOGIES, Cleveland, OH (US)

(72) Inventor: Gang Tian, Westlake, OH (US)

(73) Assignee: LINESTREAM TECHNOLOGIES, Cleveland, OH (US)

(*) Notice: Subject to any disclaimer, the term of this patent is extended or adjusted under 35 U.S.C. 154(b) by 0 days.

(21) Appl. No.: 15/085,244

(22) Filed: Mar. 30, 2016

(51) Int. Cl.
    *B60T 7/12* (2006.01)
    *B60W 50/00* (2006.01)

(52) U.S. Cl.
    CPC . *B60W 50/0098* (2013.01); *B60W 2510/0657* (2013.01); *B60W 2520/105* (2013.01); *B60W 2550/148* (2013.01); *B60W 2720/106* (2013.01)

(58) Field of Classification Search
    CPC .................................................. B60W 50/0098
    USPC ............... 701/84; 318/400.01, 58, 646, 638; 360/55, 75, 77.04
    See application file for complete search history.

(56) References Cited

U.S. PATENT DOCUMENTS

| | | | |
|---|---|---|---|
| 4,751,985 A | 6/1988 | Chambers | |
| 5,035,301 A | 7/1991 | Skalski | |
| 5,378,861 A | 1/1995 | Barten et al. | |
| 6,470,225 B1 | 10/2002 | Yutkowitz | |
| 6,552,507 B2 | 4/2003 | Miyazawa | |
| 7,076,322 B2 | 7/2006 | Chandhoke | |
| 7,917,863 B2 | 3/2011 | Chandhoke et al. | |
| 7,919,940 B2 | 4/2011 | Miller et al. | |
| 8,060,340 B2 | 11/2011 | Gao et al. | |
| 8,447,469 B2* | 5/2013 | Colosky | G01P 3/48 180/443 |
| 8,644,963 B2 | 2/2014 | Gao et al. | |

(Continued)

FOREIGN PATENT DOCUMENTS

JP    5176729    4/2013

OTHER PUBLICATIONS

International Search Report & Written Opinion for PCT Application Serial No. PCT/US17/22646, dated Jul. 7, 2017, 11 pages.

*Primary Examiner* — Thomas G Black
*Assistant Examiner* — Luke Huynh
(74) *Attorney, Agent, or Firm* — Amin, Turocy & Watson LLP

(57) ABSTRACT

A maximum acceleration identification system determines a suitable maximum acceleration for transitioning a given motion/motor system to a target position or velocity, taking the friction of the motion system into consideration. The maximum acceleration determined by the maximum acceleration identification system can then be used by the motion control system as the acceleration limit for generating motion profiles. Thus, motion profiles can be generated that are closer to the true maximum acceleration supported by the motion system without violating the mechanical and electrical constraints of the system as characterized in part by the viscous friction, resulting in a more time-optimal move. In some embodiments, the maximum acceleration identification system can automatically set the maximum acceleration of the control system's profile generator to be equal to the derived value, thereby eliminating the need for the maximum acceleration to be selected and set by the system designer.

20 Claims, 13 Drawing Sheets

(56) References Cited

U.S. PATENT DOCUMENTS

| | | | |
|---|---|---|---|
| 8,700,190 B2 | 4/2014 | Wang et al. | |
| 8,710,777 B2* | 4/2014 | Tian | G05B 13/0265 |
| | | | 318/400.1 |
| 8,928,271 B2 | 1/2015 | Bucella et al. | |
| 9,008,876 B2 | 4/2015 | Pinto et al. | |
| 9,052,705 B2 | 6/2015 | Gao | |
| 9,261,872 B2 | 2/2016 | Shilpiekandula et al. | |
| 2008/0203960 A1* | 8/2008 | Golownia | G01M 1/10 |
| | | | 318/646 |
| 2015/0008861 A1 | 1/2015 | Sonoda | |
| 2017/0074753 A1 | 3/2017 | Tian | |

\* cited by examiner

AUTOMATIC DETERMINATION OF MAXIMUM ACCELERATION FOR MOTION PROFILES

TECHNICAL FIELD

This disclosure generally relates to motion/motor control systems, and, for example, to techniques for determining motion profile constraints.

BACKGROUND

Many automation applications employ motion control systems to control position and speed motion devices. Such motion control systems typically include one or more motors or similar actuating devices operating under the guidance of a controller, which sends position and/or speed control instructions to the motor in accordance with a user-defined control algorithm or program. In a common architecture, the controller sends the control instructions to a motor drive (e.g., as an analog signal or a series of discrete step signals), and the motor drive controls the driving current output to the motor in accordance with the control instructions, facilitating the controlled movement of the motor.

When the controller determines that the motion system must move to a new position or alter its velocity (e.g., in accordance with the control algorithm or a user request), the controller must calculate a position or velocity trajectory—referred to as a motion profile—for transitioning the motion system from its current position or velocity to the target position or velocity. The motion profile defines the motion system's velocity, acceleration, and/or position over time as the system moves from the current state to the target state. Once this motion profile is calculated, the controller translates the motion profile into appropriate control signaling for moving the motion system through the trajectory defined by the profile.

In some applications, the various segments (or stages) of the motion profile are calculated based on predetermined user-defined constraints (e.g., maximum velocity, maximum acceleration, etc.), where the defined constraints may correspond to mechanical limitations of the motion system. Given these constraints and the desired target position and/or velocity, the controller will calculate the motion profile used to carry out the desired move or velocity change. The resultant motion profile is also a function of the type of profile the controller is configured to generate—e.g., a trapezoidal profile, an S-curve profile, or another type of profile.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for determining and setting a suitable maximum acceleration for transitioning a motion system to a target position or velocity, where the determination of the maximum acceleration considers the viscous friction of the motion system. The system can model the torque of the motion system over time, where the torque model includes a model of the combined Coulomb friction and speed-dependent viscous friction. An analytic solution or optimal algorithm can be applied to the model in order to determine the maximum acceleration that can be achieved without violating the mechanical constraints of the motion system as defined in part by the Coulomb and viscous frictions. The maximum acceleration determined in this manner can then be provided to the motion control system as a constraint for generating a motion profile for transitioning the motion system to the target position or velocity (e.g., by setting the upper bound of the motion profile's acceleration reference equal to the maximum acceleration identified by the system).

Conventionally, the maximum acceleration for a motion control system is set manually by the system designer based on presumed or estimated mechanical limitations of the motion system. These estimations typically do not consider the viscous friction present in the motion system due to the complexities involved in factoring the viscous friction. Consequently, system designers typically set the maximum acceleration to be lower than the true maximum acceleration that can be tolerated by the motion system, resulting in slower point-to-point moves. By considering the viscous and Coulomb frictions when determining the maximum acceleration, the system described herein can identify a maximum acceleration that is closer to the true maximum acceleration that can be achieved by the motion system, yielding faster point-to-point moves relative to manual estimations of the maximum acceleration.

Also, for permanent magnet synchronous motors (PMSMs) and induction motors (IMs), the system described herein considers the changes to the maximum torque for such motors when operating in the field weakening region when determining the maximum acceleration. In general, PMSM and IM motors are capable of operating in different operating regions—a constant torque region and a constant power region. In the constant torque region, the maximum torque is relatively constant. In the constant power region, the maximum torque is not a fixed value, but rather decreases as the speed increases. The maximum acceleration identification system described herein considers this variable maximum torque when determining the maximum acceleration for a given motion profile.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
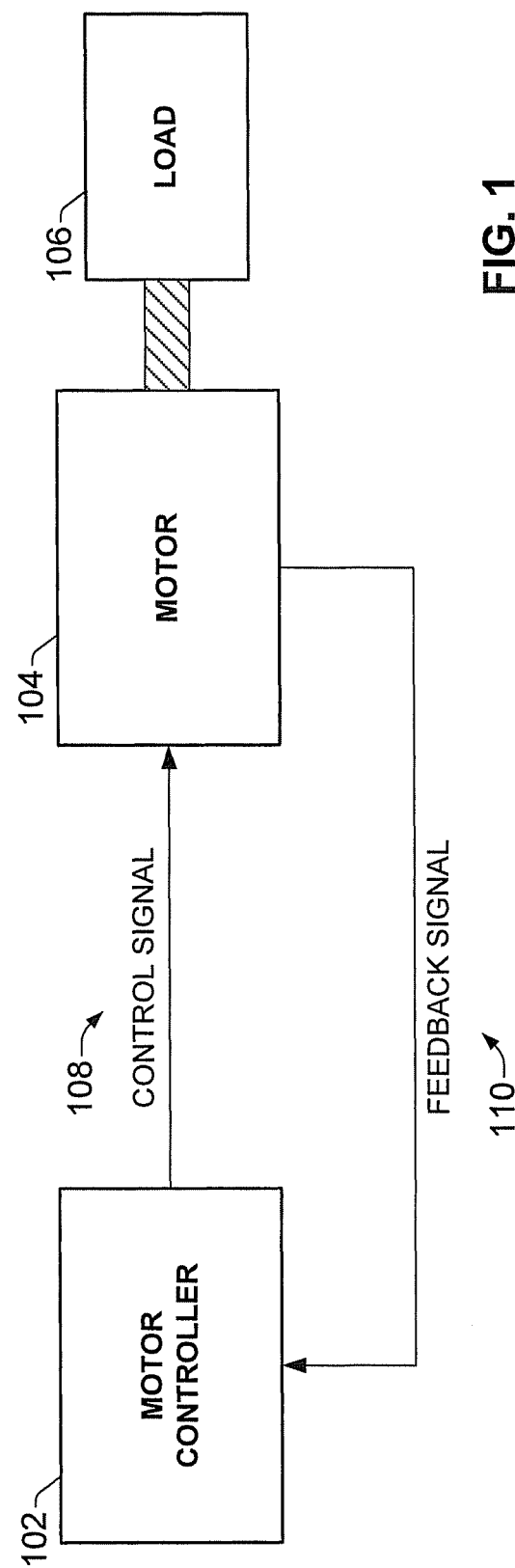
FIG. 1 is a block diagram of a simplified closed-loop motion control architecture.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate to techniques for determining a maximum acceleration for a motion/motor system given a set of mechanical and electrical constraints in order to reach a target speed or position in minimum time. The maximum acceleration determined by the system described herein can be used to set or validate the acceleration and deceleration limit configurations of the user's motion control system, so that the motion profiles generated by the motion control system may substantially minimize the time required for the motion system to transition from a present position or velocity to a new position or velocity. In one or more embodiments, the torque is derived in an expression of frictions, load, inertia, and motion profile elements, and the maximum acceleration/deceleration is obtained from the optimal solution subject to the mechanical/electrical constraints. With the maximum acceleration/deceleration, a motion control system can determine a substantially minimum-time speed or position motion profile to generate trajectories to the jerk limit and torque limit.

To illustrate an example context for the techniques described herein, FIG. 1 depicts a simplified closed-loop motion control architecture. Motor controller 102 is programmed to control motor 104, which drives mechanical load 106. In various example applications, motor 104 may be used to drive an industrial automation application or industrial tool, including but not limited to a machining or material handling robot, a conveyor, a tooling machine, a motorized hand tool, etc. Motor 104 may also be used in the traction and/or propulsion system of an electric vehicle design, including but not limited to electric or hybrid electric automobiles, bicycles, forklifts and other industrial vehicles, scooters, railway vehicles such as trains, or other such vehicles. Motor 104 may also be used in building infrastructure and HVAC (heating, ventilating, and air conditioning) applications that require speed or motion control, such as fans and pumps. Motor 104 may also be used in a home or industrial appliance. For example, motor 104 may be used to drive the drum of a home or industrial washing machine, to control the spinning of a centrifuge, or to control the motion of other such appliances.

Motor controller 102, motor 104, and load 106 comprise the main components of an example motion control system, wherein linear and/or rotational motion of the load 106 is controlled by motor controller 102. In an example application, load 106 can represent an axis of a single- or multi-axis robot or positioning system in which the position of the load 106 is controlled in response to position instructions generated by motor controller 102. In such applications, motor controller 102 sends control signal 108 (e.g., a torque control signal) that causes the motor 104 to move the load 106 to a desired position. The control signal 108 can be provided directly to the motor 104, or to a motor drive (not shown) that controls the speed and direction of the motor by varying the power delivered to the motor 104 in accordance with the control signal 108. Feedback signal 110 indicates a current state (e.g., position, velocity, etc.) of the motor 104 and/or load 106 in substantially real-time. In servo-driven systems, feedback signal 110 can be generated, for example, by an encoder or resolver (not shown) that tracks an absolute or relative position of the motor. In sensorless systems lacking a velocity sensor, the feedback signal can be provided by a speed/position estimator. During a move operation, the motor controller 102 monitors feedback signal 110 to ensure that the load 106 has accurately reached the target position. Motor controller 102 compares the actual position of the load as indicated by the feedback signal 110 with the target position, and adjusts the control signal 108 as needed to reduce or eliminate error between the actual and target positions.

In another example scenario, the motion control application can be a speed control system in which the velocity of the load 106 is controlled in accordance with control instructions generated by motor controller 102. In this example, motor controller 102 provides an instruction to motor 104 (via control signal 108) to transition from a first velocity to a second velocity, and makes necessary adjustments to the control signal 108 based on feedback signal 110.

It is to be appreciated that the maximum acceleration determination techniques of the present disclosure are not limited to use with the example types of motion control systems described above, but are applicable for any suitable motion control application. For example, the techniques described herein may also be used in motion control systems that operate in an open-loop configuration that omits feedback signal 110.

In some applications, motor controller 102 will control motor 104 in accordance with motion profiles calculated by a higher-level control program, such as a program executed by a programmable logic controller (PLC), a microcontroller, embedded motion control chip, or other such controller. In such applications, the higher-level controller will determine the required target position and/or velocity of the motion device, and calculate a motion profile defining a trajectory for transitioning the load 106 to the target position and/or velocity. The motor controller 102 then translates this motion profile to appropriate control signaling that implements the trajectory defined by the motion profile.

The response of the mechanical system comprising the motor 104 and the load 106 to changes in the control signal 108 are partially a function of the system's mechanical characteristics, including the friction of the mechanical system. Friction is the resistive force resulting from the sliding contact between physical components of the motion system, such as the contact between the rotor and the shaft. The system's total friction can be modeled as a combination of its Coulomb friction and viscous friction. The system's Coulomb friction Bc has a relatively constant magnitude represented by the magnitude of the friction just as the system begins moving from a state of rest. The viscous friction, which represents a frictional force that may be a function of lubrication between moving parts of the system, typically increases as a function of the speed of the motion system, and has a speed-dependent magnitude based on the viscous friction coefficient Bv of the motion system.

Although some degree of viscous friction exists in all motion systems, viscous friction is often neglected or ignored when calculating motion profiles due to derivation complexity. Instead, system designers typically enter parameters into the motion system defining a set of mechanical constraints—e.g., acceleration limits, speed limits, etc.— that act as constraints on the motion profiles generated by the control system. Since these manually entered parameters are often based on the designer's estimates of the motions system's mechanical limitations, the maximum acceleration is typically set to be lower than the actual maximum acceleration that can be achieved by the motion system, resulting in non-optimal performance. The speed of transitioning the motion system to a target position or speed may be improved by taking the viscous friction into account, which could yield a maximum acceleration that is closer to the true acceleration limit that can be tolerated by the motion system.

Moreover, the torque capacity for a given motor may not be constant at all speeds. For example, for PMSM and IM motors, the torque capacity of the motor remains relatively constant while operating in the constant torque (i.e., normal speed) region, but decreases as a function of increasing speed when operating in the constant power (i.e., field weakening) region. Although derivations of maximum acceleration could be simplified by assuming a constant torque limit under all operating conditions, derivations made under this assumption are rendered inaccurate during operation in the constant power region.

To address these and other issues, one or more embodiments described herein describe systems and methods for determining a maximum acceleration for a given motion system based on mechanical/electrical characteristics of the motion/motor system, including the viscous friction. The maximum acceleration identified by the system can then be used as an upper bound on the acceleration reference of a motion profile generated by the motion/motor control system to implement a position or velocity step. In this manner, the systems described herein seek to achieve the fastest move within the limits of the mechanical/electrical system being controlled.

Figure 2:
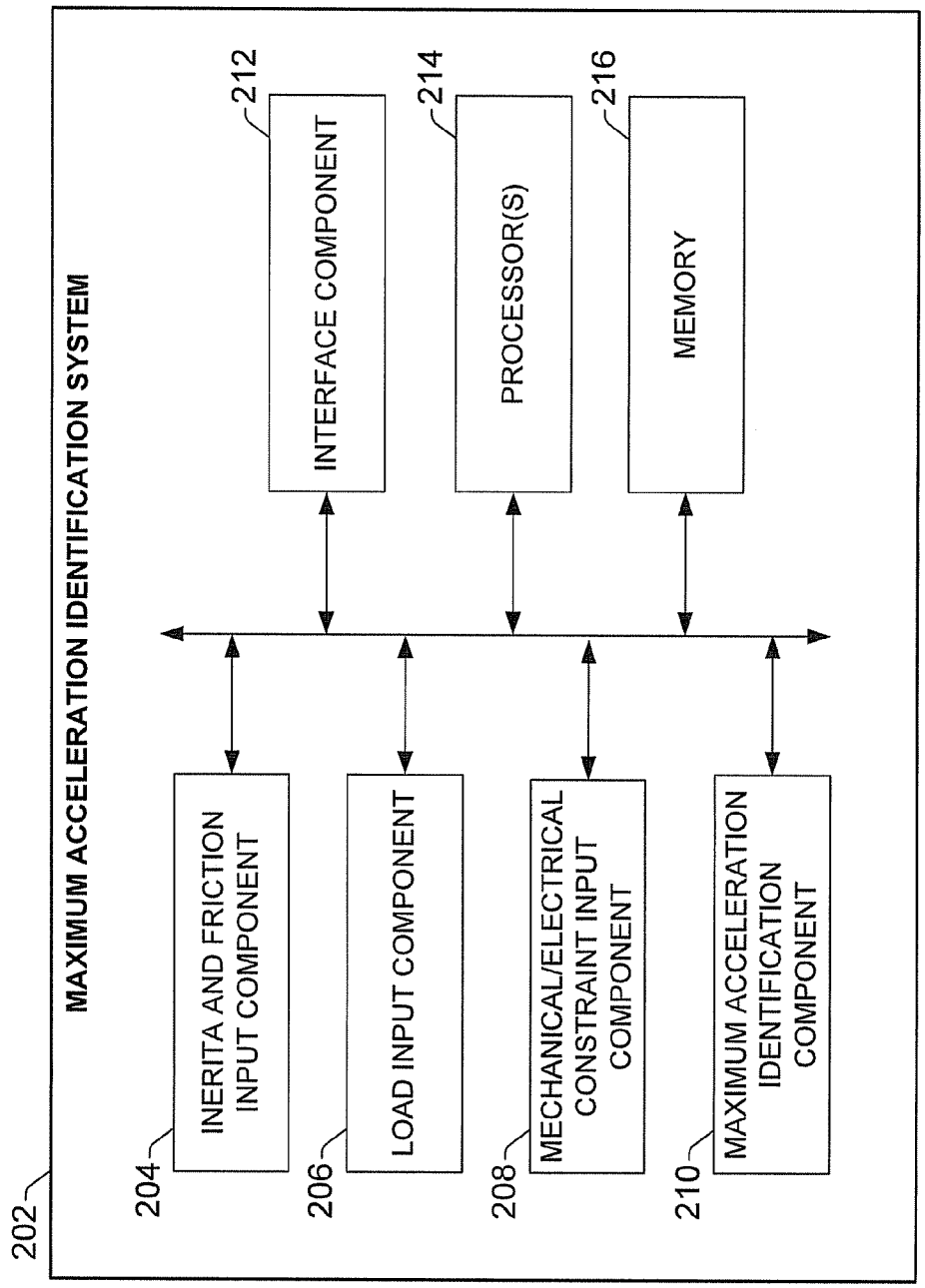
FIG. 2 is a block diagram of an example maximum acceleration identification system capable of determining a maximum acceleration for a motion system based on mechanical constraints of the motion system.

FIG. 2 is a block diagram of an example maximum acceleration identification system 202 capable of determining a maximum acceleration for a motion/motor system based on mechanical/electrical constraints. The maximum acceleration determined by system 202 can be used by a motion control system to generate suitable motion profiles that take this maximum acceleration into consideration, thereby substantially minimizing the time required to transition to a new position or speed setpoint. Maximum acceleration identification system 202 can include a friction input component 204, a load input 206, a mechanical/electrical constraint input component 208, a maximum acceleration identification component 210, an interface component 212, one or more processors 214, and memory 216. In various embodiments, one or more of the friction input component 204, load input component 206, mechanical/electrical constraint input component 208, maximum acceleration identification component 210, interface component 212, the one or more processors 214, and memory 216 can be electrically and/or communicatively coupled to one another to perform one or more of the functions of the maximum acceleration identification system 202. In some embodiments, components 204, 206, 208, 210, and 212 can comprise software instructions stored on memory 216 and executed by processor(s) 214. The maximum acceleration identification system 202 may also interact with other hardware and/or software components not depicted in FIG. 2. For example, processor(s) 214 may interact with one or more external user interface devices, such as a keyboard, a mouse, a display monitor, a touchscreen, or other such interface devices.

Friction input component 204 can be configured to receive, measure, or otherwise determine Coulomb friction and viscous friction estimates; e.g., from an online parameter estimation system or via manual entry. In some embodiments, friction input component 204 may be configured to receive manually provided values of the Coulomb friction and viscous friction coefficient for a given motion system, where these values may be determined by a design engineer using independent measurement techniques. Alternatively, some embodiments of friction input component 204 may be configured to automatically determine values of the Coulomb friction and viscous friction coefficient based on measurements taken during operation of the motion system, or during a defined test sequence designed to output a controlled test torque command signal to the motion system and measure corresponding velocities of the system in response to the torque command values.

Load input component 206 can be configured to receive, measure, or otherwise determine load data representing an amount of load on the motion system. The load value used to determine the maximum acceleration or deceleration may be either a constant load value seen by the motion system or a defined maximum allowable load for the motion system. Mechanical/electrical constraint input component 208 can be configured to receive mechanical/electrical constraint data representing a jerk limit and data describing a maximum torque curve (as a function of speed) for the motion system. The maximum torque curve for a given motor may be represented, for example, as a look-up table or expression derived based on the motor parameters, current limit of the motor, and voltage limit of the motor. The maximum acceleration identification component 210 can be configured to determine a maximum acceleration and/or deceleration for the motion system based on desired start and end speeds, as well as the friction, load, and constraint information received via the friction input component 204, the load input component 206, and the mechanical/electrical constraint input component 208.

Interface component 212 can be configured to receive user input and to render output to the user in any suitable format (e.g., visual, audio, tactile, etc.). User input can be, for example, user-entered constraints (e.g., jerk limits, torque limits, etc.) used by the maximum acceleration identification system 202 to calculate a suitable maximum acceleration (to be described in more detail below). The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
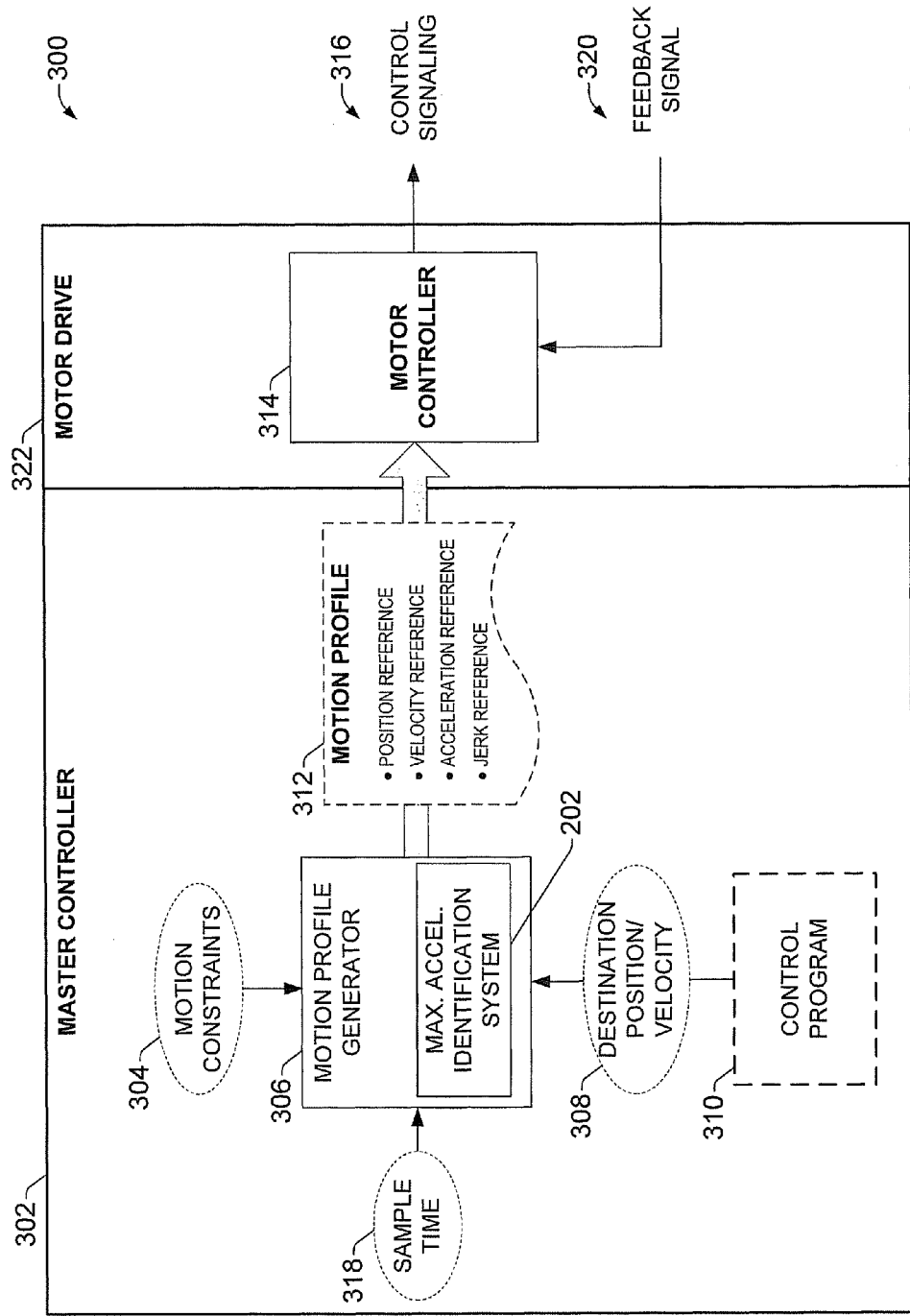
FIG. 3 is a diagram of an example motion control system comprising a master controller that utilizes a profile generator and an associated maximum acceleration identification system.

In some embodiments, the maximum acceleration identification system 202 can be part of a motion profile generator that is an integrated component of a motion controller. FIG. 3 illustrates an example motion control system 300 comprising a master controller 302 that utilizes a profile generator 306 according to one or more embodiments of this disclosure. Master controller 302 can be, for example, a programmable logic controller (PLC), a microcontroller, or other such controller that monitors and controls a system (e.g., an industrial process, an automation system, a batch process, etc.) that includes one or more motion devices. In this example, profile generator 306 can be a functional component of the controller's operating system and/or control software executed by one or more processors residing on the controller 302. Profile generator 306 can also be a hardware component residing within controller 302, such as a circuit board or integrated circuit, that exchanges data with other functional elements of the controller 308. Other suitable implementations of profile generator 306 are also within the scope of certain embodiments of this disclosure. For example, although profile generator 306 is illustrated in FIG. 3 as being an integrated component of controller 302, the profile generator 306 may be a separate element from controller 302 in some embodiments. For such configurations, profile generator 306 can exchange data with controller 302 or other elements of the motion system via any suitable communications means, including but not limited to wired or wireless networking, hardwired data links, or other such communication means.

Example motion control system 300 also comprises a motor drive 322, which includes a motion controller 314 for controlling a motion device (e.g., a motor, not shown) in accordance with a motion profile 312 provided by master controller 302. The motion profile 312 defines a trajectory for transitioning the motion device from a current position or velocity to a target position or velocity, where the trajectory is defined in terms of one or more of a position reference, a velocity reference, an acceleration reference, and/or a jerk reference. In response to receiving motion profile data from master controller 302, motor controller 314 will translate the motion profile 312 into control signaling 316, which is sent to the motion device to effect transitioning of the motion device to the target position or velocity. If the motor controller 314 is a closed-loop controller, motor controller 314 will also monitor a feedback signal 320 indicating an actual state of the motion device (e.g., the real-time position, velocity, etc.) as the control signaling 316 is being applied. Based on this feedback signal 320, the motor controller 314 will adjust the control signaling 316 as necessary to ensure that the motion device moves in accordance with the motion profile 312 as closely as possible. Alternatively, if the motor controller 314 is an open-loop controller, the motor controller 314 will still generate control signaling 316 based on motion profile 312, but will not monitor the feedback signal 320 during the resulting move.

In the present example, master controller 302 controls the system in accordance with a control program 310, which is stored and executed on the controller 302. During operation, control program 310 may require that the motion device move to a new position, or transition to a new velocity. The destination position or velocity 308 is provided to profile generator 306, which calculates a motion profile 312 that defines a trajectory for the move. Profile generator 306 calculates the motion profile 312 as a function of one or more motion constraints 304, which can represent mechanical constraints of the motion system or user preferences regarding operation of the motion device. Motion constraints 304 can be provided by the user prior to operation (e.g., via interface component 212 of FIG. 2). In some embodiments, profile generator 306 can also calculate the motion profile 312 based additionally on the sample time 318 of the controller 302, to ensure that the profile segments align with the controller's sample points, as will be discussed in more detail below.

Motion profile 312 can define the trajectory of the point-to-point move over time in terms of one or more of a position reference, a velocity reference, an acceleration reference, and a jerk reference. These references represent functions calculated by the motion profile generator 306 defining how the respective motion attributes will be controlled as a function of time for a given point-to-point move. These references are mathematically related to one another as derivatives. That is, jerk is the derivative of acceleration, acceleration is the derivative of velocity, and velocity is the derivative of position. Profile generator 306 can calculate these references for respective stages of the trajectory profile. As will be described in more detail below, the maximum acceleration identification system 202 can determine a suitable maximum acceleration for the motion system based on mechanical characteristics of the controlled mechanical system—including the friction and load—and this determined maximum acceleration can be used by the profile generator 306 as a parameter for generating the motion profile 312.

Once the motion profile 312 for the move is calculated, profile generator 306 provides the motion profile 312 to the motor controller 314, which translates the motion profile 312 into control signaling 316 (e.g., a torque command signal or other type of signaling) that instructs the motion device to perform the desired point-to-point move in accordance with the motion profile 312. As described above, if the motor controller 314 is a closed-loop controller, control signaling 316 will be a function of the motion profile 312 as well as feedback signal 320, which informs the motor controller 314 of the actual state of the motion device in real-time. For open-loop control systems, the control signaling 316 will be a function only of the motion profile 312.

It is to be understood that the architecture depicted in FIG. 3 is only intended to be an example context in which maximum acceleration identification system 202 may operate, and that other operating contexts are within the scope of this disclosure. For example, in some scenarios, master controller 302 may be a self-contained controller that includes integrated motor control capabilities. In such applications, the controller 302 may itself translate the motion profile 312 into a suitable control signal 316 and send this control signal 316 to the motion device, rather than providing the motion profile 312 to a separate motor drive 322. In another exemplary architecture, profile generator 306 may be an integrated component of motor drive 322.

Figure 4:
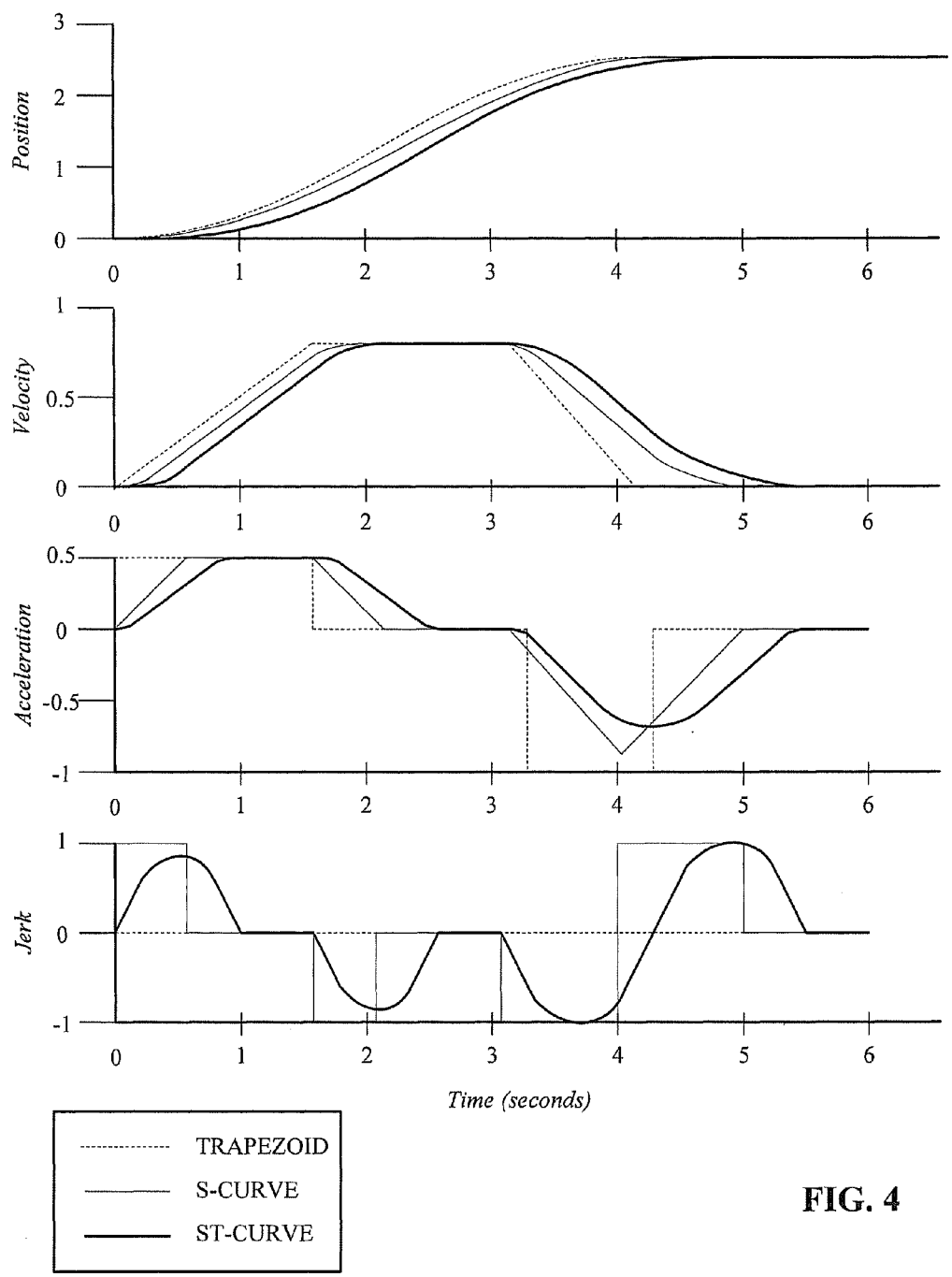
FIG. 4 are example motion profile graphs that compare example trapezoidal, S-curve, and ST-curve profiles.

The motion profile 312 generated by controller 302 is typically a function of the type of profile the controller 302 is configured to generate. Various profile types may include, for example, trapezoidal profiles, S-curve profiles, or another profile type referred to herein as an ST-curve profile. FIG. 4 are example motion profiles that compare example trapezoidal, S-curve, and ST-curve profile. The time graphs illustrated in FIG. 4 plot the position, velocity, acceleration, and jerk references for a given motion trajectory between position 0 (the start position) and position 2.5 (the end or target position). The plotted values are mathematically related to one another as derivatives. That is, velocity is the derivative of position (i.e., the rate of change of position), acceleration is the derivative of velocity, and jerk is the derivative of acceleration.

For a trapezoidal profile (represented by the dashed lines in FIG. 4), the controller will calculate the motion profile according to three distinct stages—an acceleration stage, a constant velocity stage, and a deceleration stage. Such a profile results in a trapezoidal velocity curve. By contrast, the S-curve profile type (represented by the solid lines in FIG. 4) modifies the trapezoidal profile by adding four additional stages corresponding to these transitions. These additional stages allow gradual transitions between the constant (or zero) velocity stages and the constant acceleration/deceleration stages, providing smoother motion and affording a finer degree of control over the motion profile. Table 1 below summarizes the seven segments of a point-to-point S-curve motion profile.

TABLE 1

| No. | Segment Name | Description |
| --- | --- | --- |
| 1 | ACC_INC | Acceleration profile increases from zero to maximum acceleration |
| 2 | ACC_HOLD | Acceleration profile stays constant as the maximum acceleration |
| 3 | ACC_DEC | Acceleration profile decreases from maximum acceleration to zero |
| 4 | VEL_HOLD | Velocity profile stays constant |
| 5 | DEC_INC | Acceleration profile absolute value increases from zero to maximum deceleration |
| 6 | DEC_HOLD | Acceleration profile absolute value stays constant as the maximum deceleration |
| 7 | DEC_DEC | Acceleration profile absolute value decreases from maximum deceleration to zero |

Initially, during the first stage (ACC_INC), the acceleration increases continuously from zero to a constant acceleration. In some scenarios, this constant acceleration will be the maximum acceleration configured for the motion control system. However, for relatively short position steps this the position profile generator 402 may determine that a smaller acceleration would result in a more accurate transition to the target position. During the second stage (ACC_HOLD), the acceleration is held at the constant rate. As the system approaches the target velocity calculated by the position profile generator 402, the third stage (ACC_DEC) is entered, during which the acceleration is gradually decreased until the constant velocity is reached. When the constant velocity has been achieved, this constant velocity is held during the fourth stage (VEL_HOLD) as the system approaches the target position. When the system is near the target position, the trajectory enters the fifth stage (DEC_INC), during which the system begins decelerating at a gradually increasing rate from zero to a target deceleration defined by the motion profile. When the target deceleration is reached, this deceleration is held during the sixth stage (DEC_HOLD). Finally, during the seventh stage (DEC_DEC), the deceleration is gradually decreased until the system reaches zero velocity, ending the move sequence.

The trapezoidal and S-curve profile types have corresponding advantages and disadvantages. Since the trapezoidal profile always accelerates or decelerates at the maximum defined acceleration rate, this profile type tends to achieve faster point-to-point motion relative to S-curve profiles. However, since the transitions between the constant (or zero) velocity and the acceleration stages are abrupt, the trapezoidal curve may cause excessive system jerk at these transitions. Moreover, there is greater risk of overshooting the target position or velocity when using a trapezoidal motion profile, which can reduce accuracy or cause the controller to expend additional work and settling time bringing the motion device back to the desired target. Alternatively, the S-curve profile can yield greater accuracy due to the more gradual transitions between the constant velocity and acceleration/deceleration phases, but at the cost of additional time spent on the initial point-to-point move.

An ST-curve profile is represented as the dark solid line in the graphs of FIG. 4. In contrast to the trapezoidal and S-curve profiles, the ST-curve profile gradually varies the jerk continuously over time during the stages of increasing and decreasing acceleration and deceleration. This can result in the smoother acceleration transitions illustrated on the acceleration graph of FIG. 4, and the corresponding smoother velocity and position curves shown in the respective velocity and position graphs. ST-curve profiles are discussed in more detail in U.S. Pat. No. 9,041,337, the entirety of which is incorporated herein by reference.

As noted above, conventional motion control systems typically do not consider the viscous friction that exists in all controlled mechanical systems due to the complexities involved in the derivations. Consequently, designers may configure acceleration limits for such motion control systems to be lower than the actual maximum acceleration that the controlled mechanical system is capable of achieving given the friction and load of the system. As a result of this lower acceleration limit, the motion control system may generate motion profiles that transition the motion system to a desired position or velocity at slower speeds than the system is capable of achieving.

To address this issue, maximum acceleration identification system 202 determines a suitable maximum acceleration for transitioning a given motion control system to a target position or velocity based in part on the friction of the motion system. The maximum acceleration determined by the maximum acceleration identification system 202 can then be used as the acceleration limit for the motion profile generator 306, or to validate the user-defined acceleration and deceleration limits set by the designer for the motion control system. In some embodiments, the maximum acceleration identification system 202 can automatically set the maximum acceleration of the control system's profile generator to be equal to the derived value, thereby eliminating the need for the maximum acceleration to be selected and set by the system designer.

Figure 5:
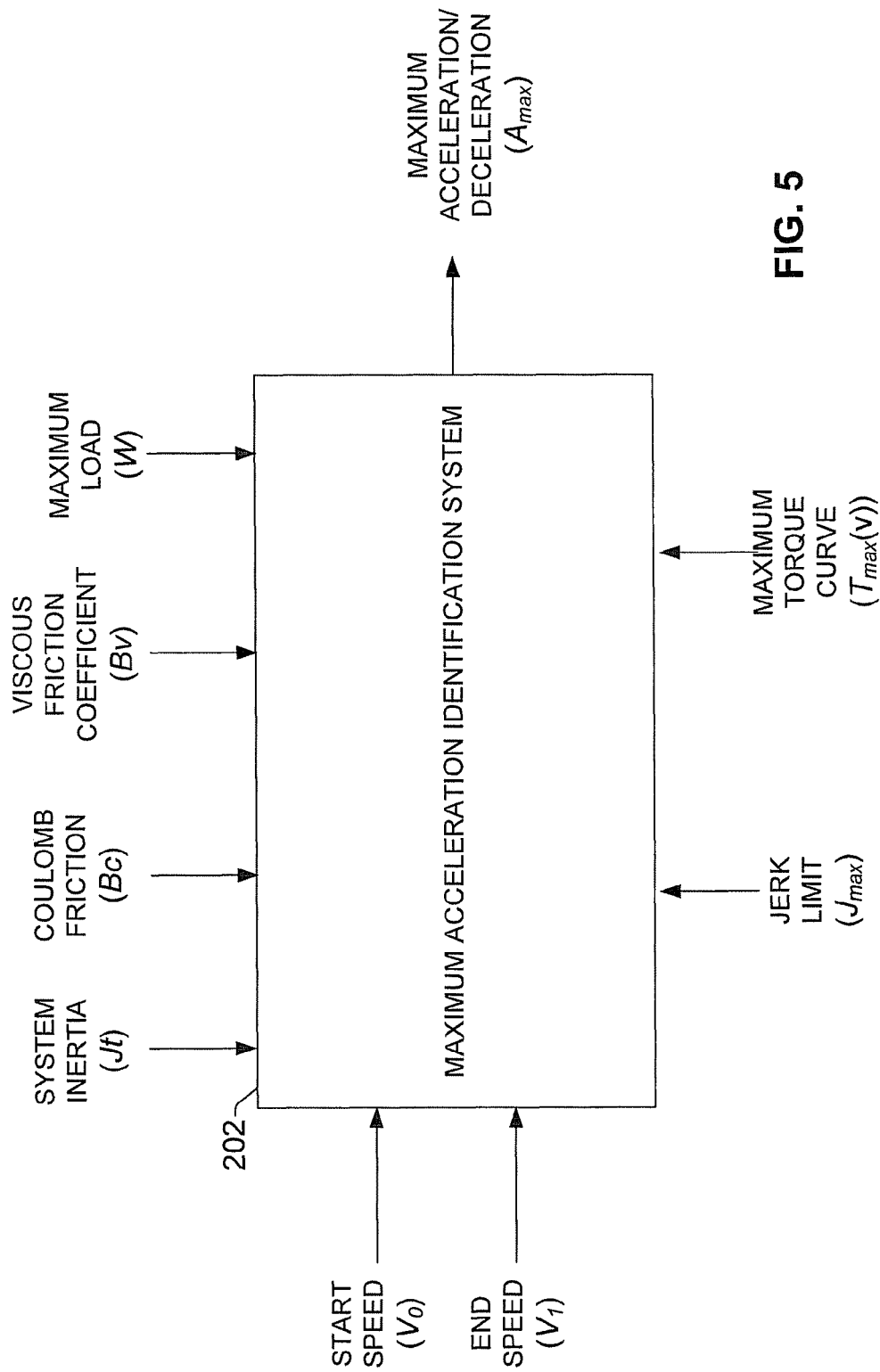
FIG. 5 is a diagram illustrating inputs and outputs of the maximum acceleration identification system.

Techniques carried out by the maximum acceleration identification system 202 to determine the maximum acceleration for a point-to-point move to be carried out by a motion control system are now described. FIG. 5 is a diagram illustrating inputs and outputs of the maximum acceleration identification system 202. In general, the problem solved by the maximum acceleration identification system 202 can be described as follows: In a motion profile design, given the jerk limit, maximum torque, Coulomb and viscous friction coefficients, and maximum load of a controlled mechanical system, determine the maximum acceleration that can be achieved by the motion system in order to reach a target speed or position in minimum time. To solve this problem, the system 202 is provided with a user-defined (or otherwise predetermined) jerk limit $J_{max}$ and the torque limit $T_{max}(v)$ (as a function of velocity v) for the motion control system (e.g., via input provided to the mechanical constraint input component 208). $J_{max}$ places a limit on the jerk reference to be defined by the motion control system, which will play a role in determining the maximum acceleration. For certain types of motors, including permanent magnet synchronous motors (PMSMS) and induction motors (IMs), the torque limit $T_{max}(v)$ can vary as a function of motor speed under certain operating conditions (e.g., in the constant power, or field weakening, region). For systems that include such motors, the motor-specific torque limit versus speed curves can be stored as look-up table information or approximated polynomial expressions, as will be discussed in more detail below.

System 202 is also provided with the inertia of the motion system Jt, as well as the Coulomb friction Bc and viscous friction coefficient By for the motion system (e.g., via the friction input component 204). In some embodiments, the inertia, Coulomb friction, and viscous friction coefficient values may be provided to the system manually by a system designer based on independently obtained estimates. Alternatively, some embodiments of the friction input component 204 may be configured to determine estimates of the motion system's inertia Jt, Coulomb friction Bc, and viscous friction coefficient By using a suitable online parameter estimation technique. An example inertia and friction estimation system capable of generating such estimates is described in co-pending U.S. patent application Ser. No. 14/851,307, the entirety of which is incorporated herein by reference. In an example estimation technique, the friction input component 204 may include an integrated inertia and friction estimation system that instructs the motion controller, during a testing sequence, to send a torque control signal to the motor that drives the motion system, where the torque control signal varies continuously over time. This torque control signal can be controlled based on a testing sequence defined in the estimation system. For example, the testing sequence may specify that the torque control signal will increase gradually at a defined rate of increase, causing the motor to accelerate. In response to the velocity of the motion system satisfying a defined criterion, the torque control signal will then gradually decrease, causing the motor to decelerate to a rest state.

During these acceleration and deceleration phases, the estimation system can measure and record the velocity of the motor over time in response to the torque control signal. The estimation system can then determine estimates of the inertia, viscous friction coefficient and the Coulomb friction for the mechanical system based on the time-varying torque signal and the measured velocity curve. For example, the estimation system may determine integrals of the velocity data and the torque command signal over selected time ranges of the testing sequence, and determine estimates of the inertia, Coulomb friction, and the viscous friction coefficient based on these integrals. It is to be appreciated that this technique for estimating the inertia, Coulomb friction, and viscous friction coefficient is only intended to be exemplary, and that any suitable technique for determining estimates of these values is within the scope of one or more embodiments of this disclosure.

The load W, which can represent a measured constant load or an allowable maximum load, is also provided to the maximum acceleration identification system 202 (e.g., via the load input component 206).

In the present example, the transition to be carried out by the motion control system is a velocity transition (that is, a transition of the motion system from a first speed to a second speed). When the motion control system is to transition the controlled mechanical system to a new speed or velocity (e.g., as determined by the control program 310 of master controller 302, or by the motion control algorithms executed by a microcontroller), the maximum acceleration identification system 202 is also provided with the start speed $V_0$ (e.g., the current speed) and end or target speed $V_1$. Although the present example determines the maximum acceleration for a velocity profile used to transition the motion system to a target velocity in minimum time, it is to be appreciated that similar techniques can be used to generate position profiles, whereby the system determines the maximum acceleration and deceleration to reach a target position in minimum time.

The motion profile generated by the motion control system can be expressed as a function of time in terms of profile elements, such as position step, start speed, end speed, acceleration, jerk, etc. In the present disclosure, the torque of the motion system is derived in the expression of frictions, load, inertia, and motion profile elements. The maximum acceleration identification system 202 determines the maximum acceleration/deceleration for the motion system from the optimal solution of these expressions. Once the maximum acceleration/deceleration is obtained, the minimum-time speed or position motion profile can be determined (e.g., by the motion profile generator 306) to generate the trajectories subject to the jerk limit and torque limit of the motion system.

Figure 6:
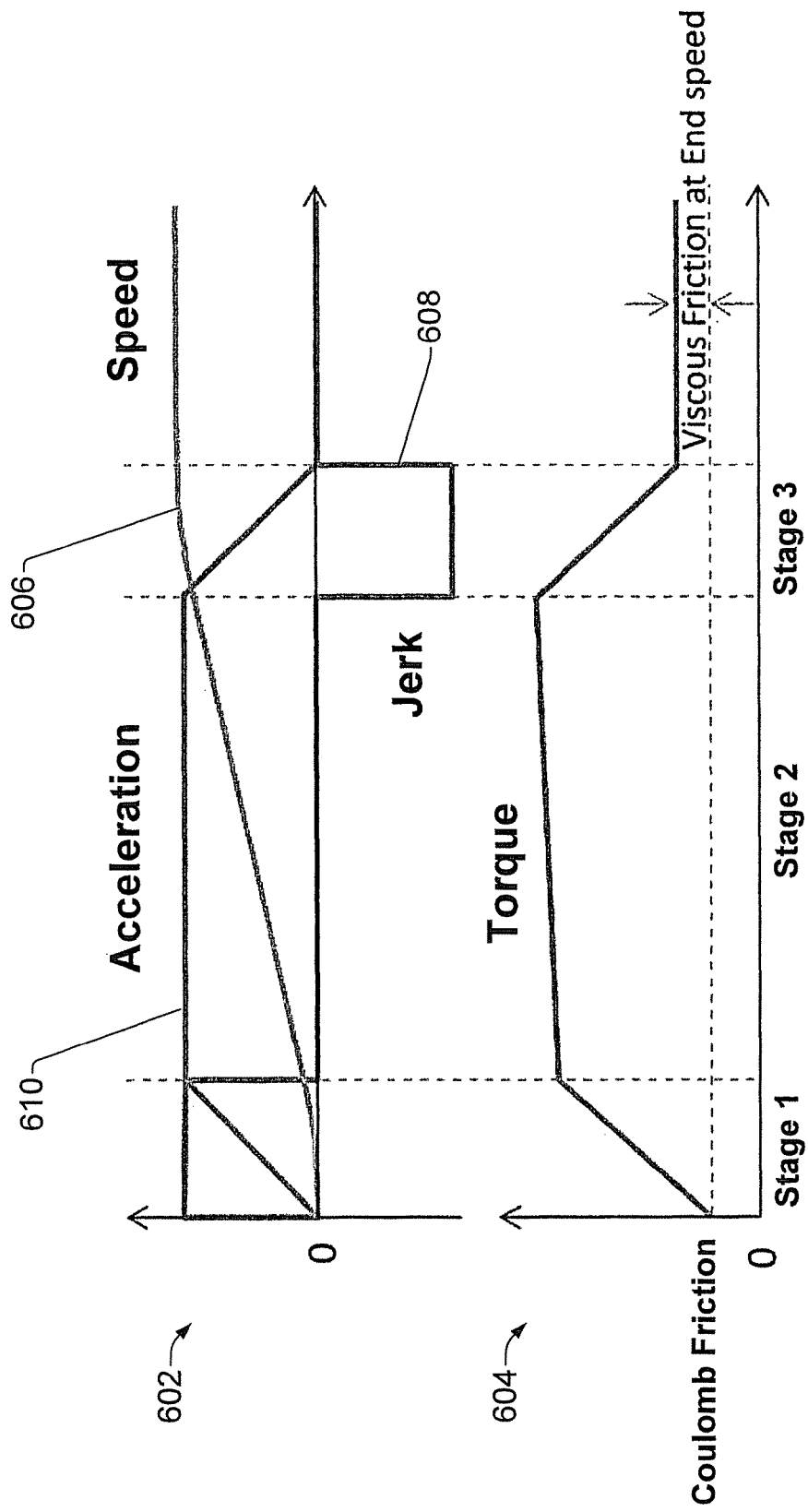
FIG. 6 are velocity, acceleration, and jerk reference graphs depicting an example speed motion profile and a corresponding torque signal generated by the motion control system in order to implement the desired motion profile.

To illustrate relationships between a motion profile, torque, and friction, FIG. 6 depicts an example speed motion profile 602 and a corresponding torque signal 604 generated by the motion control system in order to implement the desired motion profile. In this example, the motion control system controls a transition of the motion system from zero speed to speed $V_1$. The example profile depicted in FIG. 6 is an S-curve motion profile. During Stage 1 (increasing acceleration), the torque signal 604 generated by the motion control system increases, causing the acceleration of the motion system to increase, as shown by the acceleration curve 610. The jerk, which is the derivative of the acceleration and is represented by curve 608, remains at a constant positive value as the acceleration increases. Note that acceleration does not begin until the torque exceeds the Coulomb friction of the motion system, which has a relatively constant magnitude represented by the magnitude of the friction just as the system begins moving from the state of rest. As the acceleration increases, the speed (represented by curve 606) begins increasing from the state of rest and an increasing rate.

Stage 2 (constant acceleration) begins when the acceleration reaches the defined maximum acceleration and levels to a constant rate. The torque continues increasing, but at a lower rate relative to Stage 1. To maintain the constant acceleration, the torque must continue to increase due to the increasing viscous friction, which is directly proportional to the speed of the motion system. Since the speed continues to increase during Stage 2, so to does the viscous friction that must be overcome by an increasing torque. Since the acceleration is constant during this stage, the jerk drops to zero.

Stage 3 (decreasing acceleration) begins when the speed approaches the desired target speed. During this stage, the acceleration decreases to zero (corresponding to a negative constant jerk), and the speed gradually settles on or near the desired speed $V_1$. To achieve negative jerk, the torque decreases during Stage 3, but does not return to zero. Instead, in order to maintain the constant speed, the torque signal must remain at a level that overcomes both the Coulomb friction and the speed-dependent viscous friction corresponding to the end speed $V_1$.

Figure 7:
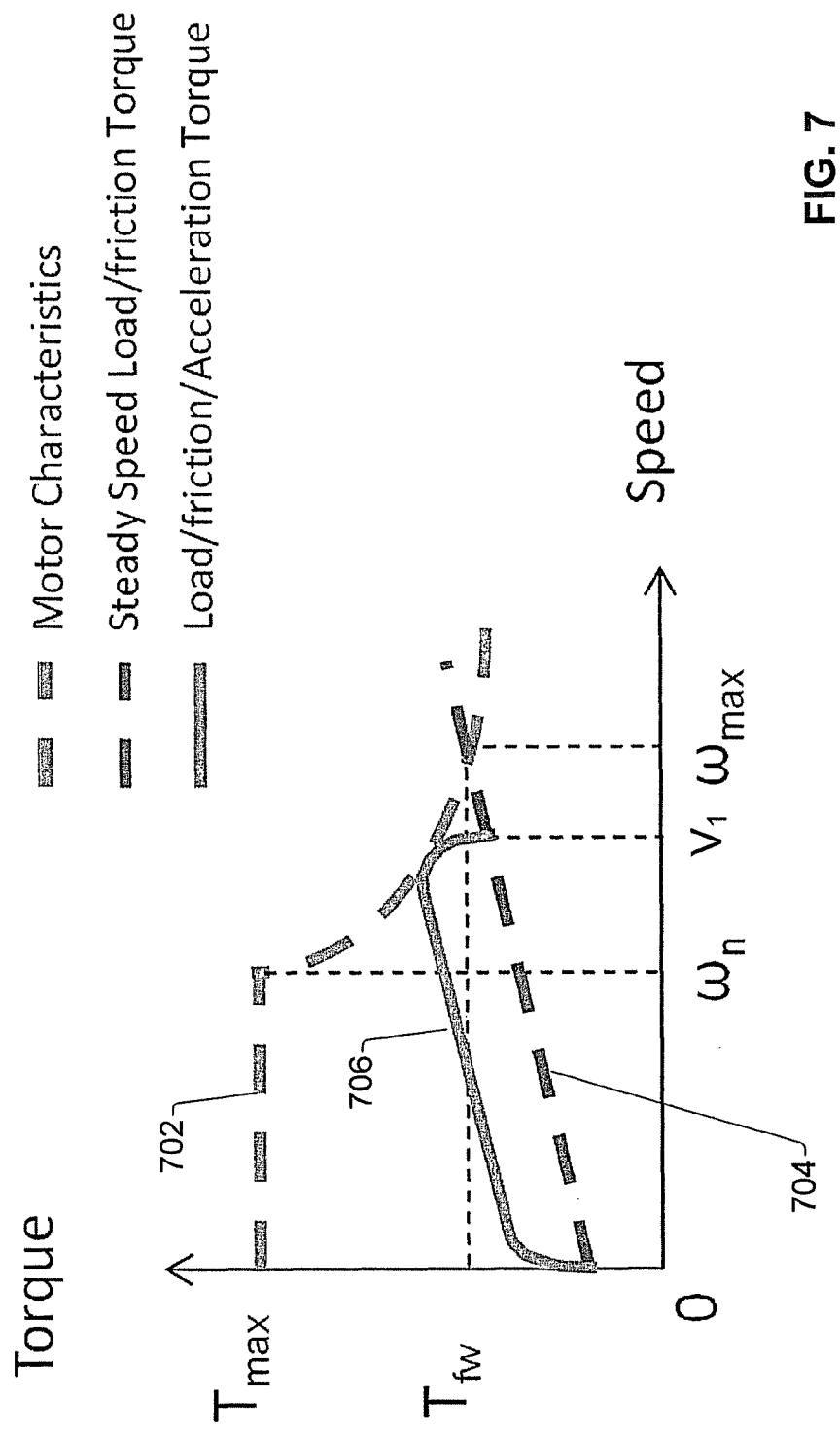
FIG. 7 is a diagram illustrating that the torque-speed trajectory of an ST-curve motion profile is limited by the motor's maximum torque-versus-speed curve.

FIG. 7 is an example plot that graphs the torque capacity of a motor as a function of speed (curve 702) as determined by the motor characteristics, the torque of the motion system as a function of steady state speed (curve 704) as determined by the combined load and friction seen by the motor, and the torque-speed relationship of an ST-curve profile (curve 706) for a permanent magnet synchronous motor (PMSM) or induction motor (IM). As demonstrated by curve 702, the torque capacity of the motor is relatively constant from the resting state up to speed $\omega_n$. This speed range—from 0 to $\omega_n$—is referred to as the constant torque region, or normal speed region. While operating at speeds below $\omega_n$, the motor is capable of providing up to its maximum torque capacity $T_{max}(v)$ as needed to compensate for load and friction, as well as to provide acceleration.

For PMSM or IM motors, if the modulation index reaches the linear boundary, field weakening can be used to achieve speeds greater than $\omega_n$ if desired. While operating in this region, as the speed increases above $\omega_n$, the torque capacity of the motor begins decreasing as a function of speed, while the power P remains relatively constant at $P=T*\omega$. Since the torque T is equal to $P/\omega$, the torque capacity decreases as speed $\omega$ increases. This operating region above $\omega_n$ is referred to as the constant power region, or field weakening region.

Curve 704 represents the actual torque needed to overcome friction and load in order for the motor to maintain a given speed. As demonstrated by curve 704, the steady state torque required to overcome friction and load of the motion system increases as a function of speed. In the field weakening (constant power) region, the maximum speed corresponds to $\omega_{Max}$ (where the torque capacity curve 702 meets the steady state torque curve 704). The torque $T_{fw}$ represents the torque required to maintain this maximum speed $\omega_{max}$ in the field weakening region.

Curve 706 depicts the torque required to accelerate from zero speed to a target speed $V_1$ between $\omega_n$ and $\omega_{max}$ in accordance with an example ST-curve profile. This torque curve may represent a torque control signal output by the motion control system to implement the ST-curve motion profile calculated to step the motion system to the target speed $V_1$. As can be seen in FIG. 7, the torque of the motion profile remains below maximum torque curve 702, which is determined by the motor characteristics. In general, the torque limit $T_{max}(v)$ is constant in the constant torque region for PMSM or IM motors. As the motor speed enters the constant power region, the torque limit $T_{max}(v)$ decreases as the speed increases.

The maximum acceleration identification system 202 considers friction and torque models when determining the maximum acceleration for the motion system. In the case of trapezoidal motion profiles, the maximum torque occurs when the motion system reaches maximum speed, and the maximum acceleration identification system 202 can determine the maximum acceleration $A_{max}$ for such trapezoidal motion profiles with respect to torque, friction, load, and inertia according to:

$$A_{max} = \frac{1}{J_t}(T_{max}(V_1) - W - B_c - B_v V_1) \quad (1)$$

Where $J_t$ is the system inertia, $T_{max}(V_1)$ is the torque limit at speed $V_1$, W is the load on the motion system (either a constant load seen by the motion system or a defined maximum allowable load for the motion system), Bc is the Coulomb friction of the motion system, Bv is the viscous friction coefficient for the motion system, and $V_1$ is the target speed (assume $V_1$ is greater than the start speed). Note that the viscous friction of the system is given as the product of the viscous friction coefficient and the speed. Estimates of the motion system's Coulomb friction Bc and the viscous friction coefficient By can be determined, for example, using a suitable online parameter estimator, as described above.

Determining the maximum torque point—and thus the maximum acceleration—is more complex for S-curve and ST-curve profiles, as well as other advanced motion profile curves. For example, if the end speed is greater than the start speed, the S-curve's maximum torque happens either at the start of Stage 3 or within Stage 3 (see FIG. 6).

The technique carried out by the maximum acceleration identification system 302 for determining the maximum acceleration for an S-curve motion profile is now described. To determine maximum acceleration, the system 302 leverages a motion module that includes Coulomb and viscous friction as well as a constant or maximum load on the motion system. The mechanical torque T required to conquer friction and load, and provide acceleration, can be given as a function of time t by:

$$T(t) = J_t \dot{v}(t) + B_v(v(t)) + B_c \mathrm{sign}(v(t)) + W \quad (2)$$

As represented by equation (2), the required torque is the sum of the inertia, viscous friction, Coulomb friction, and load. As the speed increases, the torque required to overcome the viscous friction (which is a function of the velocity v(t)) also increases. As a result, the higher the speed of the motion system, the more torque is required to overcome viscous friction and maintain the speed.

An S-curve speed motion profile is used in the following example to illustrate the technique carried out by the maximum acceleration identification system 202 for determining the maximum acceleration (an ST-curve example will also discussed below). An S-curve speed motion profile can be written in the following equations in three stages:

$$j(t) = \ddot{v}(t) = J \begin{cases} 1, & 0 < t < t_1 \\ 0, & 0 < t < t_2 \\ -1, & 0 < t < t_1 \end{cases} \quad (3)$$

$$a(t) = \dot{v}(t) = J \begin{cases} t, & 0 < t < t_1 \\ t_1, & 0 < t < t_2 \\ t - t_1, & 0 < t < t_1 \end{cases} \quad (4)$$

$$v(t) = V_0 + \mathrm{sign}(V_1 - V_0)J \begin{cases} \frac{1}{2}t^2, & 0 < t < t_1 \\ t_1\left(t + \frac{1}{2}t_1\right), & 0 < t < t_2 \\ t_1\left(t_2 + \frac{1}{2}t_1\right) + t_1 t - \frac{1}{2}t_2, & 0 < t < t_1 \end{cases} \quad (5)$$

where $t_1 = A/J$, $t_2 = (V/A) - (NJ)$,

A is the profile maximum acceleration (positive value),

J is the profile maximum jerk (positive value) (for S-curve profiles, J is equal to the user-defined jerk limit $J_{max}$ provided by the user, and $V = V_1 - V_0$, representing the profile speed step (positive value).

Given these relationships, the maximum acceleration identification system 202 determines the maximum acceleration A for the motion profile by solving:

$$\min(-A) \quad (6)$$

Subject to:

$$T(t) = J_t \dot{v}(t) + B_v(v(t)) + B_c \mathrm{sign}(v(t)) + W \quad (2)$$

$$|T(t)| \leq T_{max}(v(t)) \quad (7)$$

$$v(t) = V_0 + \mathrm{sign}(V_1 - V_0) J \begin{cases} \frac{1}{2} t^2, & 0 < t < t_1 \\ t_1 \left( t + \frac{1}{2} t_1 \right), & 0 < t < t_2 \\ t_1 \left( t_2 + \frac{1}{2} t_1 \right) + t_1 t - \frac{1}{2} t_2, & 0 < t < t_1 \end{cases} \quad (5)$$

$$t_1 = \frac{A}{J} \geq 0 \quad (8)$$

$$t_2 = \frac{V}{A} - \frac{A}{J} \geq 0 \quad (9)$$

where $T_{max}(v(t))$ in equation (7) is the maximum torque as a function of velocity v(t) (see, e.g., curve 702 of FIG. 7 discussed above). To determine the maximum torque versus speed curve $T_{max}(v(t))$, the system 202 can store and reference a look-up table or approximated polynomial expression representing $T_{max}(v(t))$. Such look-up tables or expressions can be predetermined through motor voltage and torque equations based on characteristic parameters of the motor that drives the motion system. For example, for PMSM motors, the torque limit versus speed curve can be represented as a function of the motor's stator resistance $R_s$, stator q-axis and d-axis inductances Lsq and Lsd, number of pole pairs Pp, rotor flux $\lambda_m$, maximum voltage $V_{max}$, and maximum current $I_{max}$:

$$T_{max}(v) = f_{pmsm}(R_s, L_{sd}, L_{sq}, P_p, \lambda_m, V_{max}, I_{max}) \quad (10)$$

For IM motors, the torque limit versus speed curve can be represented as a function of the motor's stator resistance $R_s$, stator inductance Ls, rotor resistance R, rotor inductance $L_r$, mutual inductance $L_m$, number of pole pairs Pp, maximum d-axis current $I_{d,max}$, maximum voltage $V_{max}$, and maximum current $I_{max}$:

$$T_{max}(v) = f_{im}(R_s, L_s, R_r, L_r, L_m, P_p, I_{d,max}, V_{max}, I_{max}) \quad (11)$$

As can be seen, the torque model represented by equation (2) includes a model of the viscous and Coulomb frictions, and is related to the velocity model represented by equations (5), (8), and (9). Equation (7) serves as an upper bound on the torque T(t) (for PMSM and IM motors, the system 202 can reference the look-up tables or expressions represented by equations (10) or (11), respectively, to determine $T_{max}(v(t))$). The torque and velocity models are generated by the maximum acceleration identification system 202 based in part on the jerk and torque limits provided by the user during the initial design or configuration of the system, the values of the Coulomb friction and viscous friction coefficient obtained by the system via either manual input or automated online estimation, and the start and end speeds defined by the move command.

The maximum acceleration identification system 202 can be configured to apply an optimization algorithm to the problem defined by equations (6), (2), (7), (5), (8), and (9) in order to obtain the maximum acceleration for the S-curve motion profile. In general, such an analytical solution identifies the maximum value of A ($A_{max}$) that does not cause the torque to exceed the torque limit $T_{max}$. In the case of more complex motion profiles for which the analytical solution is difficult to find, an optimal algorithm can be designed to solve the problem defined by equations (6), (2), (7), (5), (8), and (9). In the case of PMSM and IM motors, the system 202 can use a different approach to solve for the maximum value of A for the different operating regions. For example, the system 202 may be configured to find an analytical solution to obtain the maximum acceleration in the constant torque regions, and to apply an optimization algorithm to obtain the maximum acceleration for the whole speed operation region.

With suitable modifications to the S-curve motion profile equations, the approach described above can also be used to determine the maximum acceleration for ST-curve motion profiles. For example, an ST-curve speed motion profile can be written in the following equations in three stages:

$$j(t) = \ddot{v}(t) = \frac{6V}{t_1^3(t_1 + t_2)} \begin{cases} t(t_1 - t), & 0 < t < t_1 \\ 0, & 0 < t < t_2 \\ -t(t_1 - t), & 0 < t < t_1 \end{cases} \quad (12)$$

$$a(t) = \dot{v}(t) = \frac{V}{t_1^3(t_1 + t_2)} \begin{cases} t^2(3t_1 - 2t), & 0 < t < t_1 \\ t_1^3, & 0 < t < t_2 \\ t_1^3 + t^2(2t - 3t_1), & 0 < t < t_1 \end{cases} \quad (13)$$

$$v(t) = V_0 + \mathrm{sign}(V_1 - V_0) \frac{V}{t_1^3(t_1 + t_2)} \quad (14)$$

$$\begin{cases} t^3 \left( t_1 - \frac{1}{2} t \right), & 0 < t < t_1 \\ t_1^3 \left( t + \frac{1}{2} t_1 \right), & 0 < t < t_2 \\ t_1^3(t_1 + t_2) - \frac{1}{2}(t + t_1)(t_1 - t)^3, & 0 < t < t_1 \end{cases}$$

Where $t_1 = \frac{3A}{2J}$ and $t_2 = \frac{V}{A} - \frac{3A}{2J}$.

The maximum acceleration identification system 202 can determine the maximum acceleration for the ST-curve motion profile by solving:

$$\min(-A) \quad (15)$$

Subject to:

$$T(t) = J_t \dot{v}(t) + B_v(v(t)) + B_c \mathrm{sign}(v(t)) + W \quad (2)$$

$$|T(t)| \leq T_{max}(v(t)) \quad (7)$$

$$v(t) = V_0 + \qquad (14)$$

$$\text{sign}(V_1 - V_0) \frac{V}{t_1^3(t_1+t_2)} \begin{cases} t_1^3\left(t_1 - \frac{1}{2}t\right), & 0 < t < t_1 \\ t_1^3\left(t + \frac{1}{2}t_1\right), & 0 < t < t_2 \\ t_1^3(t_1+t_2) - \frac{1}{2}(t+t_1)(t_1-t)^3, & 0 < t < t_1 \end{cases}$$

$$t_1 = \frac{3A}{2J} \geq 0 \qquad (16)$$

$$t_2 = \frac{V}{A} - \frac{3A}{2J} \geq 0 \qquad (17)$$

In the ST-curve case, the profile maximum jerk J may be equal to or less than the user-defined jerk limit $J_{max}$ provided by the user.

As in the S-curve case, the system 202 can store and reference a look-up table or approximated polynomial expression representing $T_{max}(v(t))$ for equation (7). The maximum acceleration identification system 202 can be configured to apply an analytical solution or optimization algorithm to the problem defined by equations (15), (2), (7), (14), (16), and (17) in order to obtain the maximum acceleration for the ST-curve motion profile. As in the S-curve case, some embodiments of system 202 may apply an analytical solution to determine the maximum acceleration in the constant torque regions, and an optimization algorithm to find the maximum acceleration in the whole speed operation region.

Although the examples described above consider the scenario of a move command that defines a target velocity for the motion system, the approach described above can also be applied in scenarios in which the motion control system specifies a target position rather than a target velocity. In this regard, the approach can be applied to the position profiles to determine the maximum acceleration and maximum deceleration—given the inertia and friction of the motion system—to reach a target position in minimum time.

By taking the friction components of the motion system into account, system 202 can determine acceleration and/or deceleration limits for a motion control system that are substantially maximized without exceeding the mechanical/electrical constraints of the system. These maximized acceleration/deceleration limits can then be provided to the motion profile generator of the motion control system, which uses the determined acceleration/deceleration limits as a constraint when generating a motion profile for implementing a position or velocity step. That is, the maximum acceleration/deceleration is used by the motion control system to generate the motion trajectories subject to the jerk and torque limits. Alternatively, the determined maximum acceleration/deceleration can be used by the system designer to validate the user-defined parameters of the motion control system.

Figure 8:
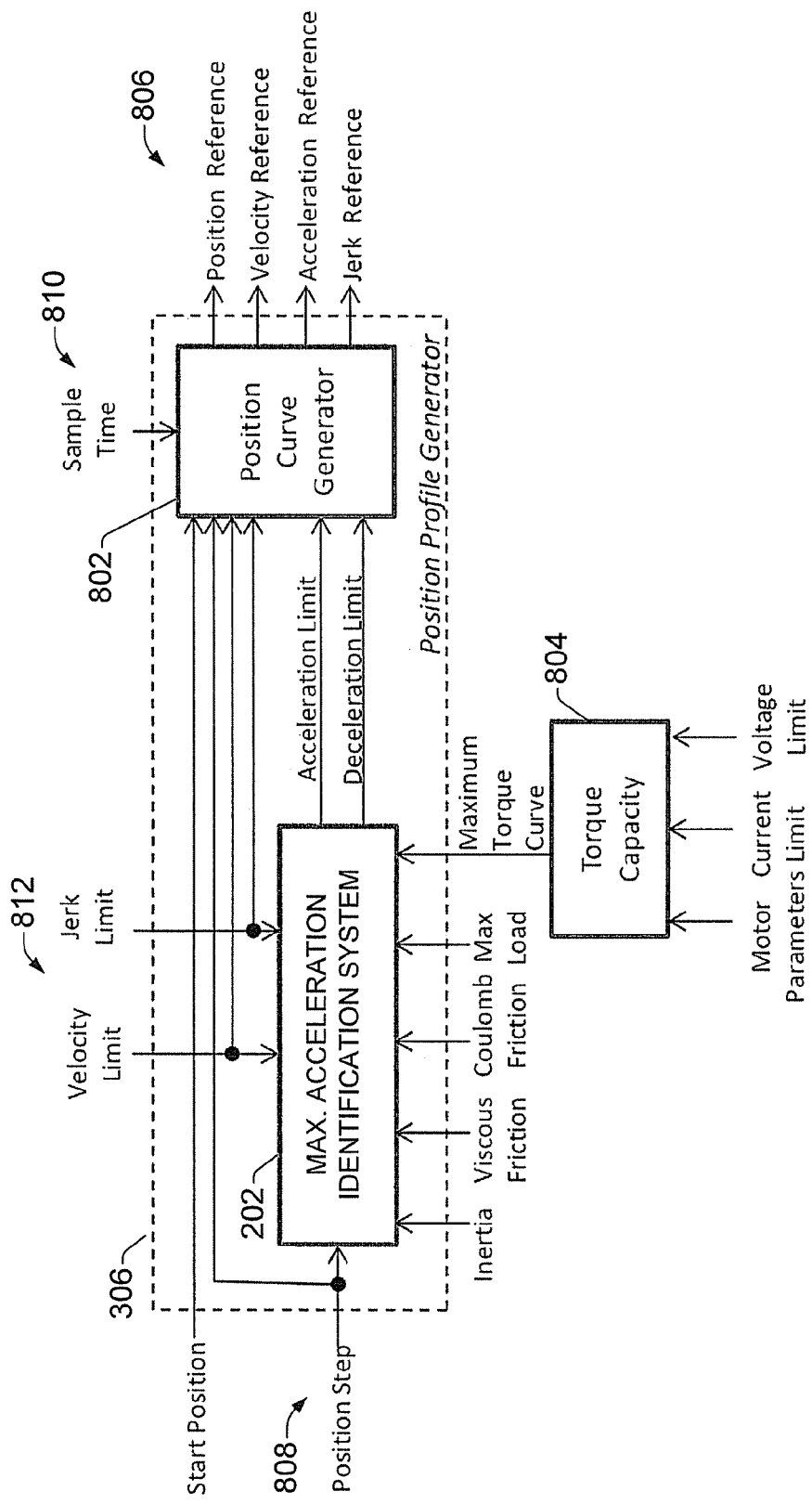
FIG. 8 is a diagram illustrating example inputs and outputs of a motion profile generator that generates motion profiles in response to position step commands.
Figure 9:
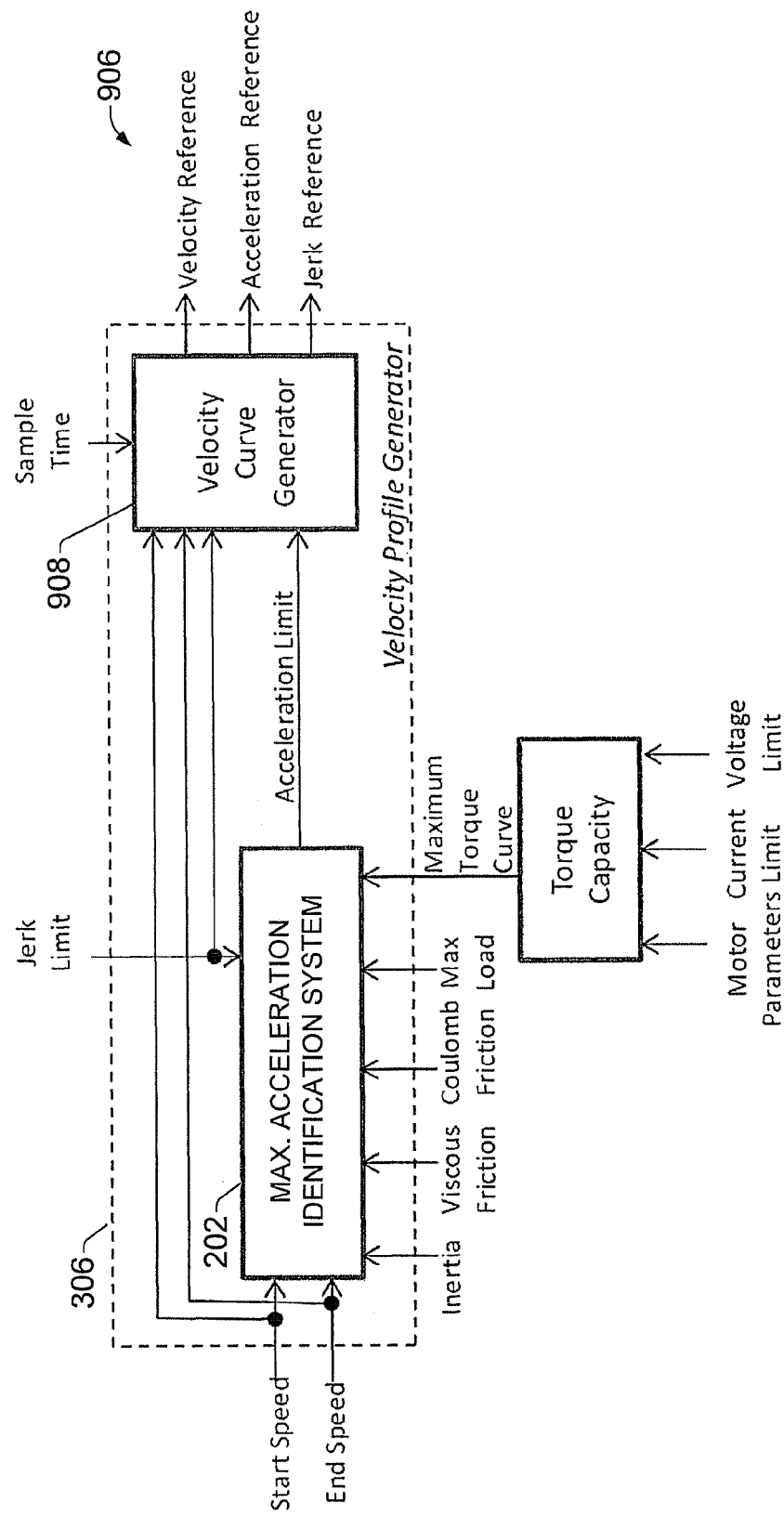
FIG. 9 is a diagram illustrating example inputs and outputs of a motion profile generator that generates motion profiles in response to velocity step commands.

For additional context, FIGS. 8 and 9 depict two types of motion profile generators 306 that can leverage the acceleration limit value generated by the maximum acceleration identification system 202. As described above, the profile generator 306 may be an integrated component of a motor controller (e.g., a PLC or other type of controller), a microcontroller, an embedded motor control chip, or other device capable of controlling a motion/motor system. In general, motion profile generators can be one or both of a position profile generator or a velocity profile generator. As shown in FIG. 8, a position profile generator 306—including the maximum acceleration identification system 202—receives a number of inputs representing mechanical constraints of the controlled system, or user preferences regarding behavior of the motion system. These constraints can include upper limits on the velocity and jerk 812 (previously provided by the system designer). As noted above, the system can store the speed-dependent maximum torque curve (i.e., the torque versus speed curve) $T_{max}(v)$ as a look-up table or expression. In FIG. 8, the table or expression representing $T_{max}(v)$ is stored in torque capacity storage 804. Derivation of the maximum torque curve $T_{max}(v)$ is based on the current and voltage limits of the motor and other motor parameters. In addition to the maximum torque curve $T_{max}(v)$, the maximum acceleration identification system 202 is also provided with the inertia, viscous friction, Coulomb friction, and load, as described in previous examples. Some or all of these mechanical characteristics can be provided manually by the user (e.g., via the interface component 212), or may be generated automatically by an online estimation system, also described in previous examples.

During operation, the position profile generator 306 will receive a position step command 808 specifying a new target position for the motion system. Position step command 808 may be generated by the control program executing on the controller (e.g., control program 310 of FIG. 3), or may be a move instruction manually input by a user. In response to the position step command 808, a position curve generator component 802 of position profile generator 306 calculates a constraint-based motion profile 806 defining a trajectory for moving the load from its start (or current) position to the target position defined by the position step command 808 (the start or current position is determined by the position profile generator; e.g., by encoder data or other position data provided by the motion control system). The motion profile 806 comprises one or more of a jerk reference, an acceleration reference, a velocity reference, or a position reference (which are mathematically related to each other as derivatives), where the acceleration reference is limited by the maximum acceleration and deceleration values determined by the maximum acceleration identification system 202. Position profile generator 306 defines these references as functions of time for each of a set of defined motion profile stages or segments (e.g., the segments summarized in Table 1 above).

In some embodiments, when provided with a position step command 808, the position curve generator component 802 can calculate one or more of a jerk reference, acceleration reference, velocity reference, or position reference for each segment of the motion profile (e.g., each of the seven segments of an S-curve profile, each of the three segments of a trapezoidal profile, etc.), thereby defining a trajectory for the motion system to implement the position step. Alternatively, in some embodiments, position curve generator 802 may determine which of the profile segments are required for a time-optimal motion profile, and calculate one or more of the jerk reference, acceleration reference, velocity reference, or position reference only for those segments deemed necessary for the move. Position curve generator 802 then combines the calculated references for the respective stages to yield a complete motion profile, which can be used by an open-loop or closed-loop motion controller (e.g., a motor drive) to drive the motion system through the trajectory defined by the motion profile.

Also, in some embodiments, the profile generator 306 may be configured to leverage the sample time 810 of the motion controller to improve the accuracy and efficiency of a point-to-point move defined by the motion profile. In such embodiments, the position curve generator 802 may be configured to force the total profile duration to be a multiple of the motion controller's sample time. For example, a profile generator that leverages the controller's sample time may be configured to calculate a time-optimal solution for a given point-to-point move, determine the time durations of the respective segments of the resultant profile, and round these durations to be multiples of the sample time. The position curve generator component 802 can then recalculate the jerk, acceleration/deceleration, velocity and/or position references for the profile to be consistent with these rounded profile times. Thus, the trajectory outputs can be aligned with the sample points, mitigating the need to compensate for small differences introduced when the total profile time falls between two sample times.

FIG. 9 illustrates an example velocity profile generator 306 that can use the acceleration limit determined by the maximum acceleration identification system 202 as constraint. Velocity profile generator 306 is similar to the position profile generator described above, but is used to calculate motion profiles in response to a desired change in velocity rather than a change in position. That is, velocity profile generator 306 calculates a time-optimal motion profile 906 for transitioning a motion system from a start speed (or current speed) to an end speed (or target speed) specified by the motion control program. Since transition to a desired velocity setpoint is typically indifferent to the motion system's position, the motion profile 906 generated by the velocity curve generator component 908 of velocity profile generator 306 may omit a position reference, and define the motion profile exclusively in terms of a jerk reference, acceleration reference and/or velocity reference, where the acceleration reference is limited by the maximum acceleration value identified by the maximum acceleration identification system 202. As with the position curve generator component 802 described above, the velocity curve generator component 908 may be configured to force the total profile duration to be a multiple of the motion controller's sample time, and/or may selectively calculate one or more of the jerk reference, acceleration reference, or velocity reference only for those segments deemed necessary for the move.

Figure 10:
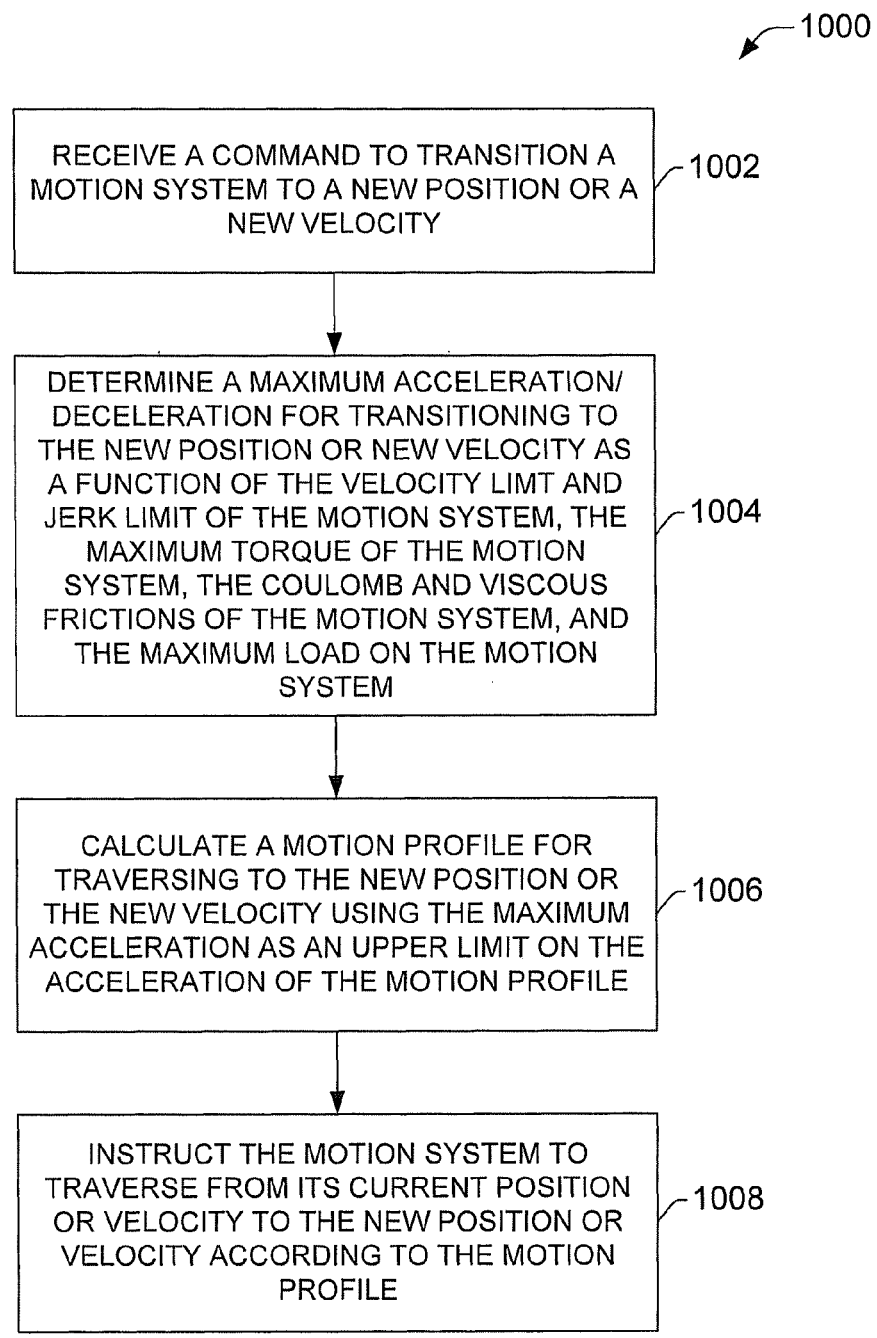
FIG. 10 is a flowchart of an example methodology for generating a substantially time-optimal motion profile for transitioning a motion system to a new position or velocity.
Figure 11:
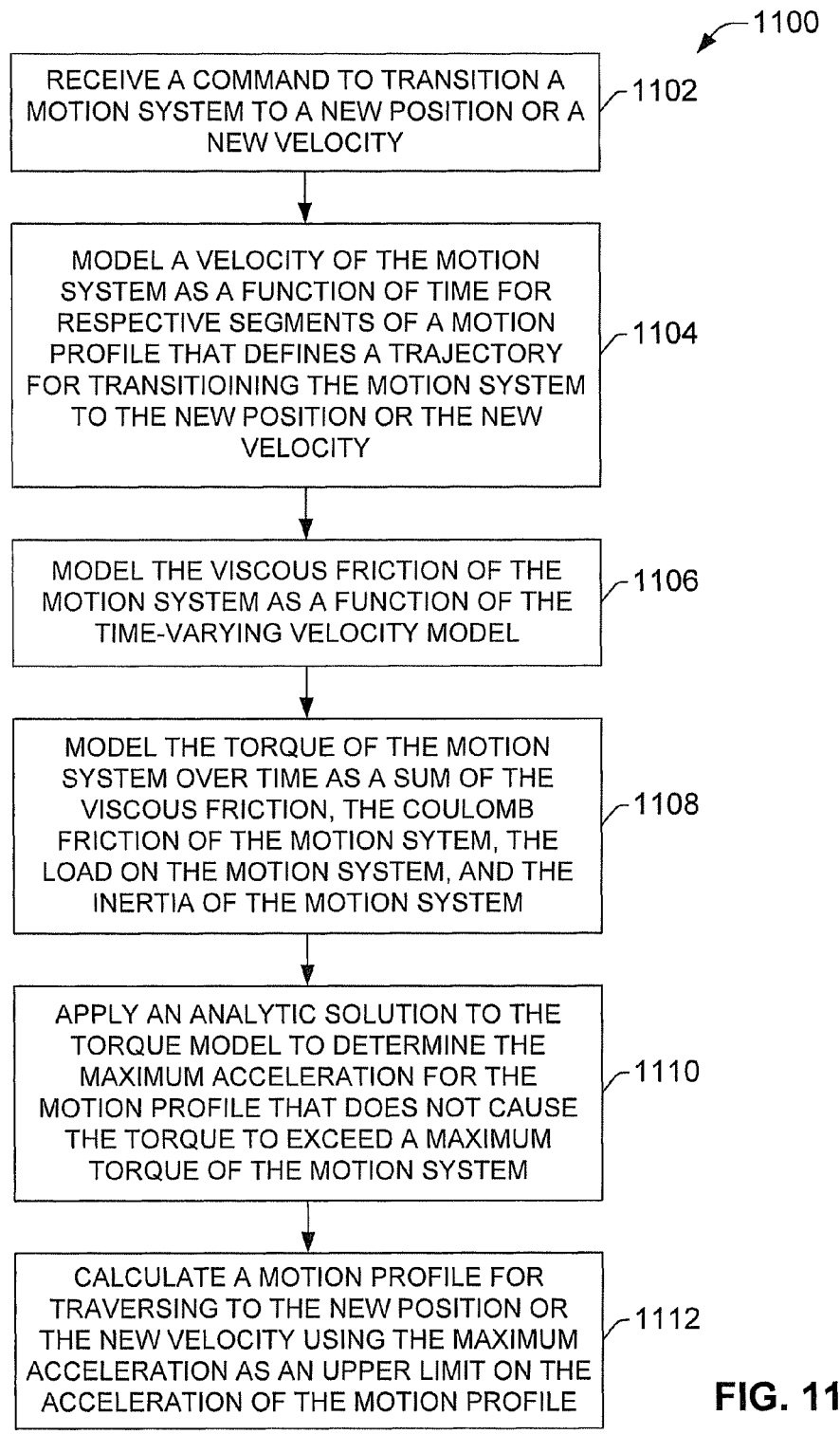
FIG. 11 is a flowchart of an example methodology for determining a maximum acceleration for a motion profile used to transition a motion system to a new position or velocity.

FIGS. 10-11 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 10 illustrates an example methodology 1000 for generating a substantially time-optimal motion profile for transitioning a motion system to a new position or velocity, where the motion system comprises a motor and a mechanical load driven by the motor. Initially, at 1002, a command to transition the motion system to a new position or velocity is received. This command can originate from a motion control program executed by a motion controller, an embedded motion control chip, or microcontroller. Alternatively, the command can be a manual move command entered by a user. The command can be received by a profile generator associated with the motion controller (e.g., profile generator 306 described above).

At 1004, a maximum acceleration and deceleration for transitioning to the new position or new velocity is determined as a function of the velocity limit and jerk limit of the motion system, the torque limit of the motion system, the Coulomb and viscous frictions of the motion system, and the maximum load on the motion system. One or more of these parameters may be entered into the motion control system manually by a system designer, or may be determined automatically (e.g., by an online parameter estimation system). In an example technique, the motion control system may be configured to automatically determine values of the Coulomb friction and viscous friction coefficient based on measurements taken during operation of the motion system, or during a defined test sequence designed to output a controlled test torque command signal to the motion system and measure corresponding velocities of the system in response to the torque command values. To determine the maximum acceleration, the torque of the system may be derived as an expression of the frictions, load, inertia, and motion profile elements. An analytical solution can then be applied to the expression to determine the maximum acceleration of the motion system that does not exceed the maximum torque of the motion system given the frictions and load.

At 1006, a motion profile is calculated for moving the motion system from its current position or velocity to the new position or velocity indicated by the command. The motion profile is generated based on the maximum acceleration determined at step 1004, such that the maximum acceleration is taken as an upper limit on the acceleration defined by the motion profile. In some embodiments, the motion profile can be calculated to define a continuous jerk reference that varies continuously as a function of time within at least one of the segments of the motion profile. Alternatively, the motion profile may be generated such that the jerk reference remains a constant value within each segment of the motion profile (while possibly varying between segments). At 1008, the motion system is instructed to traverse from its current position or velocity to the new position or velocity according to the motion profile defined at step 1006. This can entail, for example, providing the motion profile calculated at step 1006 to a motor drive, which generates signaling that controls a motor of the motion system in accordance with the motion profile and (in the case of closed-loop control) a feedback signal providing measured real-time state data for the mechanical system.

FIG. 11 illustrates an example methodology 1100 for determining a maximum acceleration for a motion profile used to transition a motion system to a new position or velocity. Initially, at 1102, a command to transition a motion system to a new position or a new velocity is received. At 1104, a velocity of the motion system is modeled as a function of time for respective segments of a motion profile that defines a trajectory for transitioning the motion system to the new position or velocity. For example, for a three-stage move in response to a command to transition from a current velocity to a target velocity, the model of the velocity may conform to equation (5) above.

At 1106, the viscous friction of the motion system is modeled as a function of the time-varying velocity model derived at step 1104. The viscous friction can be modeled, for example, as the product of the time-varying velocity and the viscous friction coefficient for the motion system, which can be provided by the system designer or obtained by the system via measurement and/or estimation. At 1108, the torque of the motion system over time is modeled as a sum of the viscous friction obtained at step 1106, the Coulomb friction of the motion system, the load on the motion system (e.g., either a constant load value seen by the motion system or a defined maximum allowable load for the motion system), and the inertia of the motion system. The inertia may also be provided manually by a system designer, or estimated by the system automatically based on measurement. The torque model may conform, for example, to equation (2) above.

At 1110, an analytical solution or an optimal algorithm is applied to the torque model to determine a maximum acceleration for the motion profile that does not cause the torque to exceed a maximum torque of the motion system. At 1112, a motion profile for traversing to the new position or the new velocity using the maximum acceleration as an upper limit on the acceleration of the motion profile.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the motion profile generating system described herein can be implemented in any computer system or environment having any number of memory or storage units (e.g., memory 216 of FIG. 2), and any number of applications and processes occurring across any number of storage units. This includes, but is not limited to, an environment with server computers and client computers deployed in a network environment or a distributed computing environment, having remote or local storage. For example, with reference to FIG. 2, friction input component 204, Load input component 206, mechanical constraint input component 208, maximum acceleration identification component 210, and interface component 212 can be stored on a single memory 216 associated with a single device, or can be distributed among multiple memories associated with respective multiple devices. Similarly, friction input component 204, Load input component 206, mechanical/electrical constraint input component 208, maximum acceleration identification component 210, and interface component 212 can be executed by a single processor 214, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
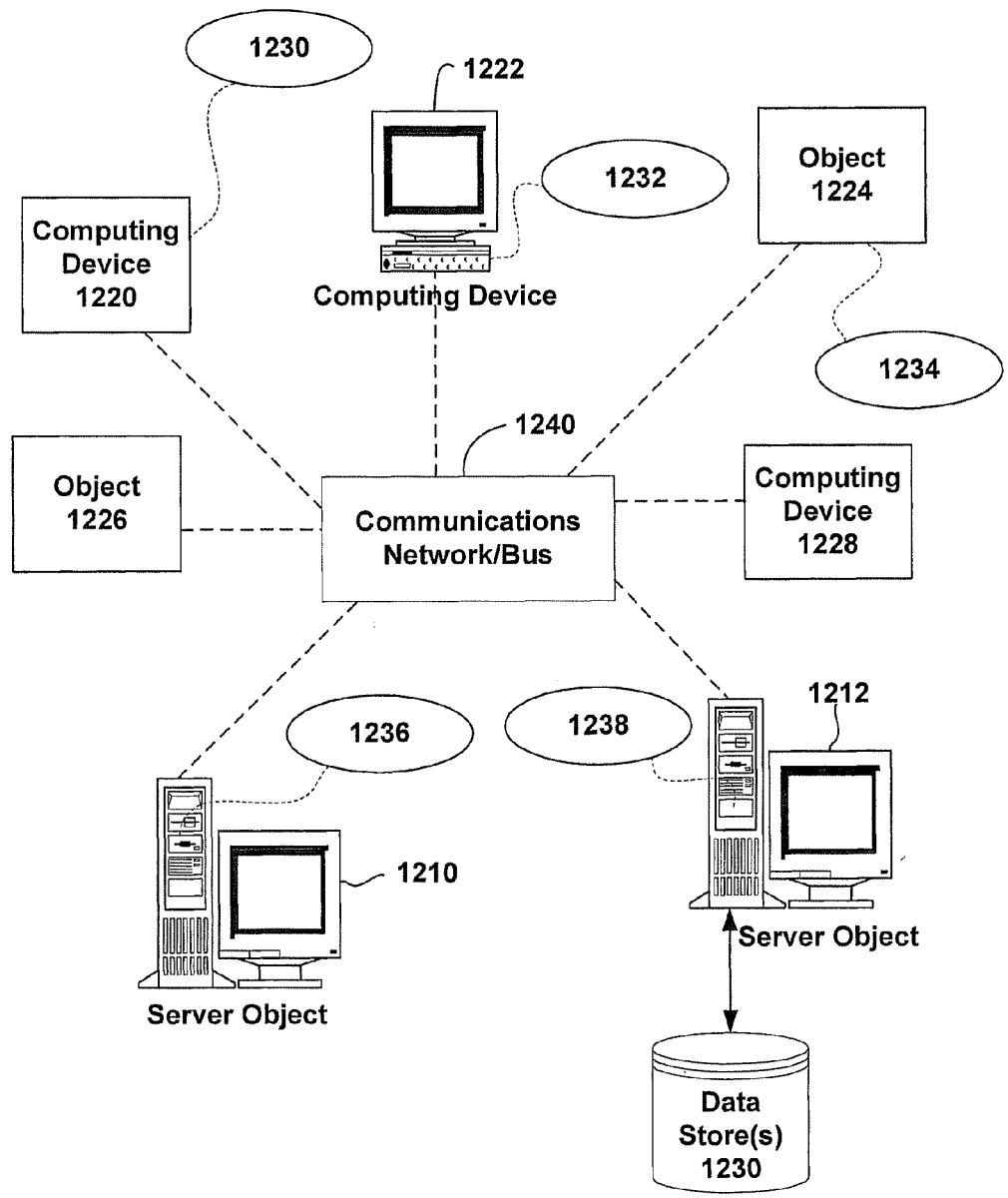
FIG. 12 is a block diagram representing an exemplary networked or distributed computing environment for implementing one or more embodiments described herein.

FIG. 12 provides a schematic diagram of an exemplary networked or distributed computing environment. The distributed computing environment includes computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, tablets, etc., where embodiments of the profile generator described herein may reside on or interact with such devices.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may comprise other computing objects and computing devices that provide services to the system of FIG. 11, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238 (e.g., friction input component 204, load input component 206, mechanical/electrical constraint input component 208, maximum acceleration identification component 210, interface component 212, or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

Figure 13:
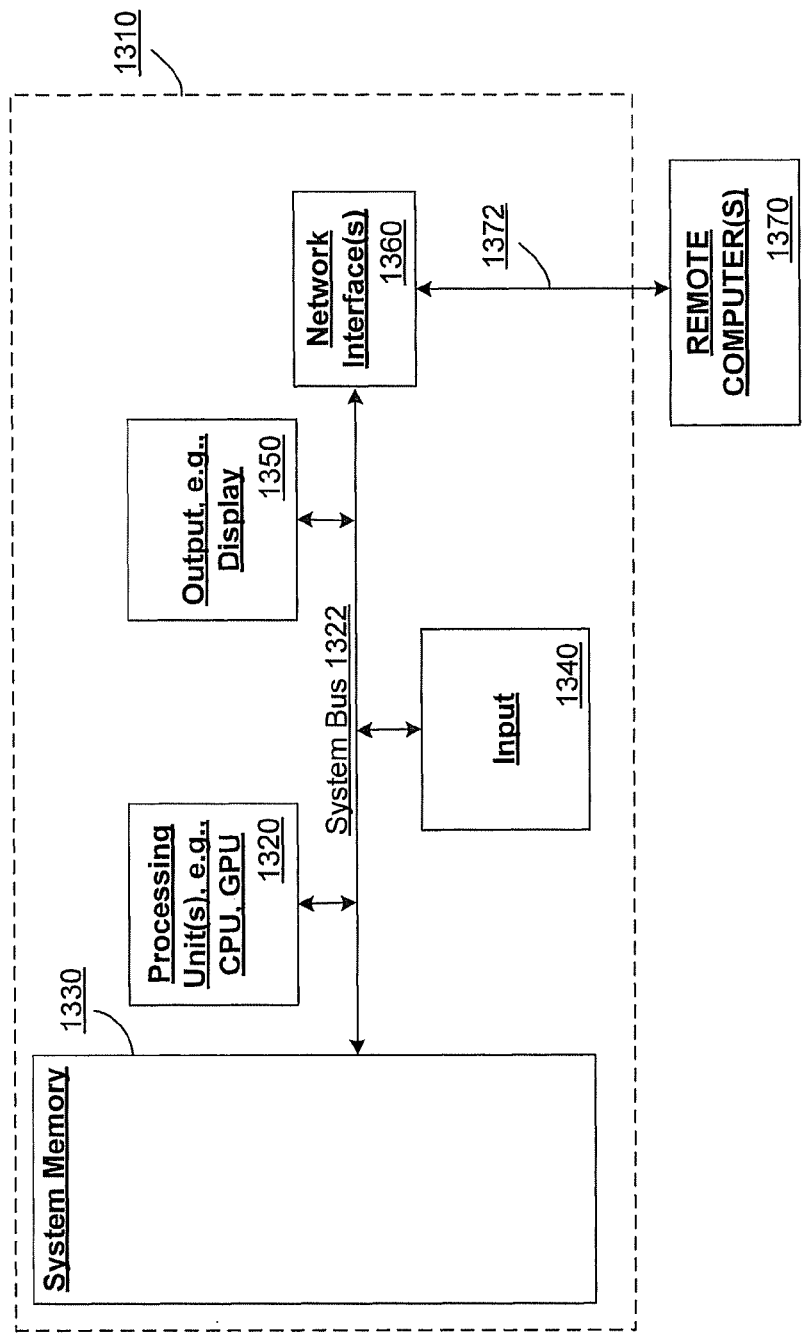
FIG. 13 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 13 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing system environment 1300 be interpreted as having any dependency or requirement relating to any one or combination of components illustrated in the exemplary computing system environment 1300.

With reference to FIG. 13, an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320. Processing unit 1320 may, for example, perform functions associated with processor(s) 214 of motion profile generating system 202, while system memory 1330 may perform functions associated with memory 216.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350. In one or more embodiments, input devices 1340 can provide user input to interface component 212, while output interface 1350 can receive information relating to operations of maximum acceleration identification system 202 from interface component 212.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art.

Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 216) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g., inferring which profile segments may be skipped), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 10-11). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system for determining an acceleration limit for control of a motion system, comprising:
   a memory;
   a processor configured to execute executable components stored on the memory, the executable components comprising:
      a friction input component configured to determine a Coulomb friction and a viscous friction coefficient for a motion system comprising a motor and a mechanical load driven by the motor;
      a load input component configured to determine a load on the motion system;
      a mechanical/electrical constraint input component configured to receive constraint data representing a jerk limit for the motion system and a torque limit for the motion system, wherein the torque limit is defined as a function of speed; and
      a maximum acceleration identification component configured to determine a maximum acceleration value for movement of the motion system to a target position or a target speed based on the Coulomb friction, the viscous friction coefficient, the load, the jerk limit, and the torque limit,
   the maximum acceleration identification component being further configured to output the maximum acceleration value to a motion controller configured to generate a motion profile for transitioning the motion system to the target position or the target speed.

2. The system of claim 1, wherein the maximum acceleration identification component is configured to determine the maximum acceleration value based on a velocity function that models a velocity of the motion system over time for respective stages of the motion profile.

3. The system of claim 1, wherein the maximum acceleration identification component is configured to determine the maximum acceleration value based on a model of a torque of the motion system over time.

4. The system of claim 3, wherein the model of the torque comprises a sum of a viscous friction of the motion system over time, the Coulomb friction of the motion system, the load on the motion system, and an inertia of the motion system, and the viscous friction is modeled as a product of the viscous friction coefficient and a velocity function over time.

5. The system of claim 3, wherein the maximum acceleration identification component is configured to determine the maximum acceleration value by applying an analytical solution to the model of the torque that identifies, as the maximum acceleration value, a highest acceleration value that does not cause the torque to exceed the torque limit.

6. The system of claim 3, wherein the maximum acceleration identification component is configured to set the maximum acceleration value to an acceleration value A that solves $$\min(-A)$$

subject to $$T(t) = J_t \dot{v}(t) + B_v(v(t)) + B_c \text{sign}(v(t)) + W$$

$$|T(t)| \leq T_{max}(v(t))$$

$$v(t) = V_0 + \text{sign}(V_1 - V_0)J \begin{cases} \frac{1}{2}t^2, & 0 < t < t_1 \\ t_1\left(t + \frac{1}{2}t_1\right), & 0 < t < t_2 \\ t_1\left(t_2 + \frac{1}{2}t_1\right) + t_1 t - \frac{1}{2}t_2, & 0 < t < t_1 \end{cases}$$

$$t_1 = \frac{A}{J} \geq 0$$

$$t_2 = \frac{V}{A} - \frac{A}{J} \geq 0$$

where
v is a speed of the motion system,
$J_t$ is an inertia of the motion system,
T is the torque,
W is the load on the motion system,
Bc is the Coulomb friction,
Bv is the viscous friction coefficient,
$V_1$ is the target speed,
$V_0$ is an initial speed of the motion system,
$T_{max}(v(t))$ is the torque limit as a function of speed,
V is a speed step of the motion profile and is the difference between $V_1$ and $V_0$, and
J is a maximum jerk of the motion profile.

7. The system of claim 5, wherein the maximum acceleration identification component is configured to set the maximum acceleration value to an acceleration value A that solves $$\min(-A)$$

subject to $$T(t) = J_t \dot{v}(t) + B_v(v(t)) + B_c \text{sign}(v(t)) + W$$

$$|T(t)| \leq T_{max}(v(t))$$

$$v(t) =$$

$$V_0 + \text{sign}(V_1 - V_0)\frac{V}{t_1^3(t_1 + t_2)} \begin{cases} t^3\left(t_1 - \frac{1}{2}t\right), & 0 < t < t_1 \\ t_1^3\left(t + \frac{1}{2}t_1\right), & 0 < t < t_2 \\ t_1^3(t_1 + t_2) - \frac{1}{2}(t + t_1)(t_1 - t)^3, & 0 < t < t_1 \end{cases}$$

-continued $$t_1 = \frac{3A}{2J} \geq 0$$

$$t_2 = \frac{V}{A} - \frac{3A}{2J} \geq 0$$

where
v is a speed of the motion system,
$J_t$ is the inertia of the motion system,
T is the torque,
W is the load on the motion system,
Bc is the Coulomb friction,
Bv is the viscous friction coefficient,
$V_1$ is the target speed,
$V_0$ is an initial speed of the motion system,
$T_{max}(v(t))$ is the torque limit as a function of speed,
V is a speed step of the motion profile and is the difference between $V_1$ and $V_0$, and
J is a maximum jerk of the motion profile.

8. The system of claim 1, wherein the motion controller is configured to generate the motion profile using the maximum acceleration value as a limit on an acceleration reference of the motion profile.

9. A method for generating a motion profile, comprising:
determining, by a system comprising a processor, a maximum acceleration value for movement of a motion system to a target position or a target velocity based on a Coulomb friction value for the motion system, a viscous friction coefficient value of the motion system, a load on the motion system, a maximum jerk of the motion system, and a maximum torque of the motion system, wherein the motion system comprises a motor and a mechanical load driven by the motor, and wherein the maximum torque is defined as a function of speed;
generating, by the system, a motion profile for transitioning the motion system to the target position or the target speed based on the maximum acceleration value; and
controlling, by the system, a control signal directed to the motion system based on the motion profile.

10. The method of claim 9, wherein the determining comprises determining the maximum acceleration value based on a velocity function that models a velocity of the motion system over time for respective stages of the motion profile.

11. The method of claim 9, wherein the determining comprises determining the maximum acceleration value based on a model of a torque of the motion system over time.

12. The method of claim 11, further comprising defining, by the system, the model of the torque as a sum of a viscous friction of the motion system over time, the Coulomb friction of the motion system, the load on the motion system, and an inertia of the motion system,
wherein the viscous friction is modeled as a product of the viscous friction coefficient and a velocity function that models a velocity of the motion system over time for respective stages of the motion profile.

13. The method of claim 11 wherein the determining further comprises:
applying an analytical solution or an optimal algorithm to the model of the torque; and
identifying, as the maximum acceleration value based on a result of the applying, a highest acceleration value that does not cause the torque to exceed the torque limit.

14. The method of claim 11, wherein the determining further comprises setting the maximum acceleration value to an acceleration value A that solves $$\min(-A)$$

subject to $$T(t) = J_t \dot{v}(t) + B_v(v(t)) + B_c \text{sign}(v(t)) + W$$

$$|T(t)| \leq T_{max}(v(t))$$

$$v(t) = V_0 + \text{sign}(V_1 - V_0)J \begin{cases} \frac{1}{2}t^2, & 0 < t < t_1 \\ t_1\left(t + \frac{1}{2}t_1\right), & 0 < t < t_2 \\ t_1\left(t_2 + \frac{1}{2}t_1\right) + t_1 t - \frac{1}{2}t_2, & 0 < t < t_1 \end{cases}$$

$$t_1 = \frac{A}{J} \geq 0$$

$$t_2 = \frac{V}{A} - \frac{A}{J} \geq 0$$

where
v is a speed of the motion system,
$J_t$ is an inertia of the motion system,
T is the torque,
W is the load on the motion system,
Bc is the Coulomb friction value,
Bv is the viscous friction coefficient value,
$V_1$ is the target speed,
$V_0$ is an initial speed of the motion system,
$T_{max}(V(t))$ is the maximum torque of the motion system as a function of speed,
V is a speed step of the motion profile and is the difference between $V_1$ and $V_0$, and
J is a maximum jerk of the motion profile.

15. The method of claim 13, wherein the determining further comprises setting the maximum acceleration value to an acceleration value A that solves $$\min(-A)$$

subject to $$T(t) = J_t \dot{v}(t) + B_v(v(t)) + B_c \text{sign}(v(t)) + W$$

$$|T(t)| \leq T_{max}(v(t))$$

$$v(t) = $$

$$V_0 + \text{sign}(V_1 - V_0)\frac{V}{t_1^3(t_1 + t_2)} \begin{cases} t^3\left(t_1 - \frac{1}{2}t\right), & 0 < t < t_1 \\ t_1^3\left(t + \frac{1}{2}t_1\right), & 0 < t < t_2 \\ t_1^3(t_1 + t_2) - \frac{1}{2}(t + t_1)(t_1 - t)^3, & 0 < t < t_1 \end{cases}$$

$$t_1 = \frac{3A}{2J} \geq 0$$

$$t_2 = \frac{V}{A} - \frac{3A}{2J} \geq 0$$

where
v is a speed of the motion system,
$J_t$ is the inertia of the motion system,
T is the torque,
W is the load on the motion system,
Bc is the Coulomb friction,
Bv is the viscous friction coefficient,
$V_1$ is the target speed,
$V_0$ is an initial speed of the motion system,
$T_{max}(v(t))$ is the torque limit of the motion system as a function of speed,
V is a speed step of the motion profile and is the difference between $V_1$ and $V_0$, and
J is a maximum jerk of the motion profile.

16. The method of claim 9, wherein the generating comprises generating the motion profile to include an acceleration reference that is limited by the maximum acceleration value.

17. A non-transitory computer-readable medium having stored thereon computer-executable instructions that, in response to execution, cause a computer system to perform operations, comprising:
  receiving a command signal instructing a motion control system to transition a motion system to a target velocity or a target position;
  determining, in response to the receiving, a maximum acceleration value for movement of the motion system to the target velocity or the target position based on a Coulomb friction for the motion system, a viscous friction of the motion system, a jerk limit of the motion system, and a torque limit of the motion system, the torque limit being defined as a function of speed;
  generating a motion profile for transitioning the motion system to the target position or the target speed based on the maximum acceleration value; and
  controlling a control signal directed to the motion system based on the motion profile.

18. The non-transitory computer-readable medium of claim 17, wherein the determining comprises determining the maximum acceleration value based on a velocity function that models a velocity of the motion system as a function of time for respective stages of the motion profile.

19. The non-transitory computer-readable medium of claim 18, wherein the determining comprises:
  modeling a torque of the motion system over time as a sum of the viscous friction, the Coulomb friction, a load on the motion system, and an inertia of the motion system, wherein the viscous friction is modeled as a product of the velocity function and a viscous friction coefficient of the motion system;
  applying an analytical solution to the model of the torque; and
  identifying, as the maximum acceleration value based on a result of the applying, a highest acceleration value that does not cause the torque to exceed the torque limit.

20. The non-transitory computer-readable medium of claim 19, wherein the determining further comprises setting the maximum acceleration value to an acceleration value A that solves $$\min(-A)$$

subject to $$T(t) = J_t \dot{v}(t) + B_v(v(t)) + B_c \text{sign}(v(t)) + W$$

$$|T(t)| \leq T_{max}(v(t))$$

$$v(t) = V_0 + \text{sign}(V_1 - V_0)J \begin{cases} \frac{1}{2}t^2, & 0 < t < t_1 \\ t_1\left(t + \frac{1}{2}t_1\right), & 0 < t < t_2 \\ t_1\left(t_2 + \frac{1}{2}t_1\right) + t_1 t - \frac{1}{2}t_2, & 0 < t < t_1 \end{cases}$$

$$t_1 = \frac{A}{J} \geq 0$$

$$t_2 = \frac{V}{A} - \frac{A}{J} \geq 0$$

where
v is a speed of the motion system,
$J_t$ is the inertia of the motion system,
T is the torque,
W is the load on the motion system,
Bc is the Coulomb friction,
Bv is the viscous friction coefficient,
$V_1$ is the target speed,
$V_0$ is an initial speed of the motion system,
$T_{max}(v(t))$ is the torque limit as a function of speed,
V is a speed step of the motion profile and is the difference between $V_1$ and $V_0$, and
J is a maximum jerk of the motion profile.

* * * * *